United States Patent
Ohta et al.

(10) Patent No.: US 11,395,366 B2
(45) Date of Patent: Jul. 19, 2022

(54) TRANSMISSION APPARATUS, RECEPTION APPARATUS, AND METHOD

(71) Applicant: FUJITSU LIMITED, Kawasaki (JP)

(72) Inventors: Yoshiaki Ohta, Yokohama (JP); Takayoshi Ode, Yokohama (JP); Yoshihiro Kawasaki, Kawasaki (JP); Nobuhisa Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 16/816,745

(22) Filed: Mar. 12, 2020

(65) Prior Publication Data

US 2020/0214080 A1 Jul. 2, 2020

Related U.S. Application Data

(63) Continuation of application No. PCT/JP2017/034222, filed on Sep. 22, 2017.

(51) Int. Cl.
*H04W 80/08* (2009.01)
*H04W 76/27* (2018.01)
(Continued)

(52) U.S. Cl.
CPC ....... *H04W 80/08* (2013.01); *H04W 28/0278* (2013.01); *H04W 72/042* (2013.01); *H04W 72/0493* (2013.01); *H04W 76/27* (2018.02)

(58) Field of Classification Search
CPC . H04W 80/08; H04W 76/27; H04W 28/0278; H04W 72/042; H04W 72/0493;
(Continued)

(56) References Cited

U.S. PATENT DOCUMENTS

2010/0302983 A1 12/2010 McBeath et al.
2014/0056278 A1 2/2014 Marinier et al.
(Continued)

FOREIGN PATENT DOCUMENTS

JP 2012-529239 A 11/2012
JP 2015-142302 A 8/2015
(Continued)

OTHER PUBLICATIONS

3GPP TSG-RAN WG2#98; Tdoc R2-1704681; Source: Ericsson, Title: PDCP Uplink transmit operation, Hangzhou, P.R. of China, May 15-19, 2017. (Year: 2017).*
(Continued)

*Primary Examiner* — Hassan A Phillips
*Assistant Examiner* — Mohammed S Chowdhury
(74) *Attorney, Agent, or Firm* — Myers Wolin, LLC

(57) ABSTRACT

A method implemented by a transmission apparatus configured to generate a radio signal based on second data obtained by sequentially processing first data addressed to a reception apparatus from an upper layer to a lower layer, the method includes: executing preprocessing configured to start generating the second data before an amount of radio resources to be allocated to the reception apparatus is determined; executing first processing when the amount of radio resources to be allocated to the reception apparatus is determined, the first processing being configured to generate the radio signal based on the second data which has an amount corresponding to the amount to be allocated among the second data generated in the preprocessing; and executing second processing that includes performing control such that the amount of the second data generated from the first data is below a first threshold in the preprocessing.

13 Claims, 8 Drawing Sheets

(51) Int. Cl.
*H04W 28/02* (2009.01)
*H04W 72/04* (2009.01)

(58) Field of Classification Search
CPC ... H04W 8/02; H04W 80/02; H04W 36/0069; H04L 47/14; H04L 47/722; H04L 69/322; H04L 49/9047
See application file for complete search history.

(56) References Cited

U.S. PATENT DOCUMENTS

| | | | |
|---|---|---|---|
| 2016/0255537 A1 | 9/2016 | Uchino et al. | |
| 2016/0345348 A1 | 11/2016 | Chae et al. | |
| 2017/0181219 A1* | 6/2017 | Cesares Cano ... | H04W 52/0216 |
| 2018/0176817 A1* | 6/2018 | Huang ............... | H04L 12/6418 |
| 2018/0206213 A1* | 7/2018 | Kim ..................... | H04L 69/322 |
| 2018/0287748 A1* | 10/2018 | Kim .................... | H04L 49/9047 |
| 2019/0349822 A1* | 11/2019 | Kim ..................... | H04W 36/08 |
| 2020/0107215 A1* | 4/2020 | Lee .................... | H04W 28/0252 |

FOREIGN PATENT DOCUMENTS

| | | |
|---|---|---|
| JP | 2015-531220 A | 10/2015 |
| JP | 2017-28415 A | 2/2017 |
| JP | 2017-510151 A | 4/2017 |

OTHER PUBLICATIONS

3GPP TSG-RAN WG2 NR Ad-hoc#2 Meeting; R2-1707388; Source: Samsung; Title: Hybrid solution for NR DC, Qingdao, China, Jun. 27-29, 2017 (Year: 2017).*

3GPP TSG RAN WG2 Meeting #98; R2-1705157; Source: Huawei, HiSilicon; Title: A Hybrid UL Split Operation, Hangzhou, China, May 15-19, 2017 (Year: 2017).*

3GPP TSG-RAN WG2 Meeting #98; R2-1705817; Source: Samsung; Title: Clarification on threshold based solution for UL split bearer, Hangzhou, China, May 15-19, 2017 (Year: 2017).*

International Telecommunication Union,"IMT Vision—Framework and overall objectives of the future development of IMT for 2020 and beyond", ITU-R, Radiocommunication Secotor of ITU, Recommendation ITU-R M.2083-0, pp. 1-19, Sep. 2015. Internet <URL: http://www.itu.int/dms_pubrec/itu-r/rec/m/R-REC-M.2083-0-201509-I!!PDF-E.pdf>.

Ericsson, "Report from [95#26] Concatenation", Agenda Item: 9.2.1.1, 3GPP TSG-RAN WG2 Meeting #95bis, R2-166904, Kaohsiung, Taiwan, Oct. 10-14, 2016.

International Search Report issued by the Japan Patent Office for corresponding International Patent Application No. PCT/JP2017/034222, dated Dec. 12, 2017, with an English translation.

Written Opinion of the International Searching Authority issued by the Japan Patent Office for corresponding International Patent Application No. PCT/JP2017/034222, dated Dec. 12, 2017, with an English translation.

Samsung,"Hybrid solution for NR DC", Agenda Item: 10.3.3.4, 3GPP TSG-RAN WG2 NR Ad-hoc#2 Meeting, R2-1707388, Qingdao, China, Jun. 27-29, 2017.

3GPP TS 36.300 V14.3.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", Jun. 2017.

3GPP TS 36.211 V14.3.0, "3rd Generation Partnership Project; Technical Specification Group Radio Access Network; Evolved Universal Terrestrial Radio Access (E-UTRA); Physical channels and modulation (Release 14)", Jun. 2017.

3GPP TS 36.212 V14.3.0, "3rd Generation Partnership Project; Technical Specification Group Radio Access Network; Evolved Universal Terrestrial Radio Access (E-UTRA); Multiplexing and channel coding (Release 14)", Jun. 2017.

3GPP TS 36.213 V14.3.0, "3rd Generation Partnership Project; Technical Specification Group Radio Access Network; Evolved Universal Terrestrial Radio Access (E-UTRA); Physical layer procedures (Release 14)", Jun. 2017.

3GPP TS 36.214 V14.2.0, "3rd Generation Partnership Project; Technical Specification Group Radio Access Network; Evolved Universal Terrestrial Radio Access (E-UTRA); Physical layer; Measurements (Release 14)", Mar. 2017.

3GPP TS 36.321 V14.3.0, "3rd Generation Partnership Project; Technical Specification Group Radio Access Network; Evolved Universal Terrestrial Radio Access (E-UTRA); Medium Access Control (MAC) protocol specification (Release 14)", Jun. 2017.

3GPP TS 36.322 V14.0.0, "3rd Generation Partnership Project; Technical Specification Group Radio Access Network; Evolved Universal Terrestrial Radio Access (E-UTRA); Radio Link Control (RLC) protocol specification (Release 14)", Mar. 2017.

3GPP TS 36.323 V14.3.0, "3rd Generation Partnership Project; Technical Specification Group Radio Access Network; Evolved Universal Terrestrial Radio Access (E-UTRA); Packet Data Convergence Protocol (PDCP) specification Release 14)", Jun. 2017.

3GPP TS 36.331 V14.3.0, "3rd Generation Partnership Project; Technical Specification Group Radio Access Network; Evolved Universal Terrestrial Radio Access (E-UTRA); Radio Resource Control (RRC); Protocol specification (Release 14)", Jun. 2017.

3GPP TS 36.413 V14.3.0, "3rd Generation Partnership Project; Technical Specification Group Radio Access Network; Evolved Universal Terrestrial Radio Access Network (E-UTRAN); S1 Application Protocol (S1AP) (Release 14)", Jun. 2017.

3GPP TS 36.423 V14.3.0, "3rd Generation Partnership Project; Technical Specification Group Radio Access Network; Evolved Universal Terrestrial Radio Access Network (E-UTRAN); X2 application protocol (X2AP) (Release 14)", Jun. 2017.

3GPP TS 36.425 V14.0.0, "3rd Generation Partnership Project; Technical Specification Group Radio Access Network; Evolved Universal Terrestrial Radio Access Network (E-UTRAN); X2 interface user plane protocol (Release 14)", Mar. 2017.

3GPP TR 36.912 V14.0.0, "3rd Generation Partnership Project; Technical Specification Group Radio Access Network; Study on New Radio (NR) access technology (Release 14)", Mar. 2017.

3GPP TR 38.913 V14.3.0, "3rd Generation Partnership Project; Technical Specification Group Radio Access Network; Study on Scenarios and Requirements for Next Generation Access Technologies; (Release 14)", Jun. 2017.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.1.0, "3rd Generation Partnership Project; Technical Specification Group Radio Access Network; Study on New Radio Access Technology Physical Layer Aspects (Release 14)", Jun. 2017.

3GPP TR 38.803 V14.1.0, "3rd Generation Partnership Project; Technical Specification Group Radio Access Network; Study on new radio access technology: Radio Frequency (RF) and co-existence aspects (Release 14)", Jun. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V14.3.1, "3rd Generation Partnership Project; Technical Specification Group Radio Access Network; Study on channel model for frequency speclrum above 6 GHz (Release 14)", Jul. 2017.

3GPP TS 38.300 V1.0.0, "3rd Generation Partnership Project; Technical Specification Group Radio Access Network; NR; NR and NG-RAN Overall Description; Stage 2 (Release 15)", Sep. 2017.

3GPP TS 37.340 V1.0.0, "3rd Generation Partnership Project; Technical Specification Group Radio Access Network; Evolved Universal Terrestrial Radio Access (E-UTRA) and NR; Multi-connectivity; Stage 2 (Release 15)", Sep. 2017, with cover sheet.

3GPP TS 38.201 V1.0.0, "3rd Generation Partnership Project; Technical Specification Group Radio Access Network; NR; Physical layer; General description (Release 15)", Sep. 2017.

(56) References Cited

OTHER PUBLICATIONS

3GPP TS 38.202 V1.0.0, "3rd Generation Partnership Project; Technical Specification Group Radio Access Network; NR; Services provided by the physical layer (Release 15)", Sep. 2017.
3GPP TS 38.211 V1.0.0, "3rd Generation Partnership Project; Technical Specification Group Radio Access Network; NR; Physical channels and modulation (Release 15)", Sep. 2017.
3GPP TS 38.212 V1.0.0, "3rd Generation Partnership Project; Technical Specification Group Radio Access Network; NR; Multiplexing and channel coding (Release 15)", Sep. 2017.
3GPP TS 38.213 V1.0.0, "3rd Generation Partnership Project; Technical Specification Group Radio Access Network; NR; Physical layer procedures for control (Release 15)", Sep. 2017.
3GPP TS 38.214 V1.0.0, "3rd Generation Partnership Project; Technical Specification Group Radio Access Network; NR; Physical layer procedures for data (Release 15)", Sep. 2017.
3GPP TS 38.215 V1.0.0, "3rd Generation Partnership Project; Technical Specification Group Radio Access Network; NR; Physical layer measurements (Release 15)", Sep. 2017.
3GPP TS 38.321 V1.0.0, "3rd Generation Partnership Project; Technical Specification Group Radio Access Network; NR; Medium Access Control (MAC) protocol specification (Release 15)", Sep. 2017, with cover sheet.
3GPP TS 38.322 V1.0.0, "3rd Generation Partnership Project; Technical Specification Group Radio Access Network; NR; Radio Link Control (RLC) protocol specification (Release 15)", Sep. 2017, with cover sheet.
3GPP TS 38.323 V0.3.0, "3rd Generation Partnership Project; Technical Specification Group Radio Access Network; NR; Packet Data Convergence Protocol (PDCP) specification (Release 15 )", Aug. 2017, clean version.
3GPP TS 38.323 V0.3.0, "3rd Generation Partnership Project; Technical Specification Group Radio Access Network; NR; Packet Data Convergence Protocol (PDCP) specification (Release 15 )", Aug. 2017, marked up version.
3GPP TS 37.324 V0.2.0, "3rd Generation Partnership Project; Technical Specification Group Radio Access Network; E-UTRA and NR; Service Data Adaptation Protocol (SDAP) specification (Release 15)", Sep. 2017.
3GPP TS 38.331 V0.0.5, "3rd Generation Partnership Project; Technical Specification Group Radio Access Network; NR; Radio Resource Control (RRC); Protocol specification (Release 15 )", Aug. 2017, clean version.
3GPP TS 38.331 V0.0.5, "3rd Generation Partnership Project; Technical Specification Group Radio Access Network; NR; Radio Resource Control (RRC); Protocol specification (Release 15 )", Aug. 2017, marked up version.
3GPP TS 38.401 V0.2.0, "3rd Generation Partnership Project; Technical Specification Group Radio Access Network; NG-RAN; Architecture description (Release 15)", Jul. 2017, clean version, with cover sheet and list of open issues.
3GPP TS 38.401 V0.2.0, "3rd Generation Partnership Project; Technical Specification Group Radio Access Network; NG-RAN; Architecture description (Release 15)", Jul. 2017, marked up version.
3GPP TS 38.410 V0.4.0, "3rd Generation Partnership Project; Technical Specification Group Radio Access Network; NG-RAN; NG general aspect and principles (FFS) (Release 15)", Sep. 2017, clean version, with cover sheet and list of open issues.
3GPP TS 38.410 V0.4.0, "3rd Generation Partnership Project; Technical Specification Group Radio Access Network; NG-RAN; NG general aspect and principles (FFS) (Release 15)", Sep. 2017, marked up version.
3GPP TS 38.413 V0.3.0, "3rd Generation Partnership Project; Technical Specification Group Radio Access Network; NG Radio Access Network (NG-RAN); NG Application Protocol (NGAP) (Release 15)", Aug. 2017, clean version, with cover sheet and list of open issues.
3GPP TS 38.413 V0.3.0, "3rd Generation Partnership Project; Technical Specification Group Radio Access Network; NG Radio Access Network (NG-RAN); NG Application Protocol (NGAP) (Release 15)", Aug. 2017, marked up version.
3GPP TS 38.420 V0.2.0, "3rd Generation Partnership Project; Technical Specification Group Radio Access Network; NG-RAN; Xn general aspects and principles (Release 15)", Jul. 2017, clean version, with cover sheet and list of open issues.
3GPP TS 38.420 V0.2.0, "3rd Generation Partnership Project; Technical Specification Group Radio Access Network; NG-RAN; Xn general aspects and principles (Release 15)", Jul. 2017, marked up version.
3GPP TS 38.423 V0.2.0, "3rd Generation Partnership Project; Technical Specification Group Radio Access Network; NG Radio Access Network (NG-RAN); Xn application protocol (XnAP) (Release 15)", Jun. 2017, clean version, with cover sheet.
3GPP TS 38.423 V0.2.0, "3rd Generation Partnership Project; Technical Specification Group Radio Access Network NG Radio Access Network; (NG-RAN); Xn application protocol (XnAP) (Release 15)", Jun. 2017, marked up version.
3GPP TS 38.470 V0.3.0, "3rd Generation Partnership Project; Technical Specification Group Radio Access Network; NG-RAN; F1 general aspects and principles (Release 15)", Sep. 2017, clean version, with cover sheet.
3GPP TS 38.470 V0.3.0, "3rd Generation Partnership Project; Technical Specification Group Radio Access Network; NG-RAN; F1 general aspects and principles (Release 15)", Sep. 2017, marked up version.
3GPP TS 38.473 V0.3.0, "3rd Generation Partnership Project; Technical Specification Group Radio Access Network; NG-RAN; F1 application protocol (F1AP) (Release 15)", Sep. 2017, clean version, with cover sheet.
3GPP TS 38.473 V0.3.0, "3rd Generation Partnership Project; Technical Specification Group Radio Access Network; NG-RAN; F1 application protocol (F1AP) (Release 15)", Sep. 2017, marked up version.
Notice of Reasons for Refusal issued by the Japan Patent Office for corresponding Japanese Patent Application No. 2019-542902, dated Jun. 8, 2021, with an English translation.
Lenovo et al., "Pre-processing for UL split bearer operation", Agenda Item: 10.3.3.4, 3GPP TSG-RAN WG2 Meeting NR #2, R2-1706880, Qingdao, P.R. China, Jun. 27-29, 2017.
Notice of Reasons for Refusal issued by the Japan Patent Office for corresponding Japanese Patent Application No. 2019-542902, dated Feb. 1, 2022, with a full English machine translation.

\* cited by examiner

TRANSMISSION APPARATUS, RECEPTION APPARATUS, AND METHOD

CROSS-REFERENCE TO RELATED APPLICATION

This application is a continuation application of International Application PCT/JP2017/034222 filed on Sep. 22, 2017 and designated the U.S., the entire contents of which are incorporated herein by reference.

FIELD

The embodiments discussed herein are related to a transmission apparatus, a reception apparatus, and a method.

BACKGROUND

In recent years, in a radio communication system (also referred to as a mobile communication system; the radio communication is also referred to as a mobile communication unless otherwise noted) such as a mobile phone system (a cellular system), a next generation radio communication technique has been discussed for achieving further increases in speed and capacity of radio communications. For example, the 3rd Generation Partnership Project (3GPP), which is a standardization organization, has already developed a specification for a communication standard called Long-Term Evolution (LTE) and a communication standard called LTE-Advanced (LTE-A) based on the radio communication technique of LTE, and is continuously conducting studies for expansion of their functions. For example, standardization of a fifth generation mobile communication system (also referred to as a 5G system) for achieving operation scenarios or contents of technical requests presented by International Telecommunication Union Radiocommunication sector (ITU-R) has been under discussion.

In communication standards for radio communication systems, a specification is defined as a protocol stack (also referred to as a hierarchical protocol) in which the functions for radio communications are divided into a series of layers. For example, a physical layer is defined as the first layer, a data link layer is defined as the second layer, and a network layer is defined as the third layer. In a fourth generation mobile communication system such as LTE, the second layer is divided into a plurality of sublayers including the first sublayer (the Packet Data Convergence Protocol (PDCP) layer), the second sublayer (the radio link control (RLC) layer), and the third sublayer (the medium access control (MAC) layer). In the fourth generation mobile communication system, the first layer may be referred to as a physical (PHY) layer. The third layer may include a Radio Resource Control (RRC) layer.

Each layer of a transmission apparatus in a radio communication system performs a process based on a predetermined protocol, such as adding of a header to a data block (also referred to as a service data unit (SDU)) from an upper layer to generate a protocol data unit (PDU), which is an information unit exchanged between peer processors of a reception apparatus, and transmits the PDU to a lower layer. For example, the RLC layer of LTE uses PDCP-PDU, a data block from the PDCP layer, which is an upper layer, as RLC-SDU and generates RLC-PDU for example by coupling a plurality of RLC-SDUs in a range falling into a transport block (TB) length given from a lower layer. The RLC-PDU is transmitted to a MAC layer that is a lower layer in a state of being added with the RLC header having a sequence number (SN) in the RLC layer.

Each layer of a reception apparatus in a radio communication system receives a data block (also referred to as PDU) from a lower layer and transmits a data block (also referred to as SDU) obtained for example by removing the header from the received data block to an upper layer. For example, the RLC of LTE refers to the RLC header added to a data block (also referred to as MAC-SDU or RLC-PDU) from the MAC layer, which is a lower layer, performs processes such as reconfiguring a plurality of RLC-SDUs stored in a single RLC-PDU, and transmits the RLC-SDUs to the PDCP layer, which is an upper layer. In this time, in order to correct the order of the RLC-SDUs for an upper layer, ordering processing based on the RLC sequence numbers included in the RLC headers is performed for reconfiguration of RLC-SDUs. In a case where it is detected that an RLC sequence number is missing, an RLC retransmission control that requests the transmission apparatus to retransmit the RLC-PDU is performed.

In the next generation mobile communication systems including the fifth generation mobile communication system and later, for example, the advent of a service such as tactile communication or augmented reality requiring a low latency in a level that is different from that so far has been expected. In order to realize such a service, the fifth generation mobile communication system has ultra-reliable and low-latency communications (URLLC) as one of functional requests. For example, in the LTE, which is a fourth generation mobile communication system, the transmission unit (also referred to as a subframe or transmission time interval (TTI)) of the wireless section is 1 [millisecond]. In a fifth generation mobile communication system, a transmission unit of 1 [millisecond] or shorter is a goal to be achieved.

The Technical Specification Group-Radio Access Network Working Group 2 (TSG-RAN WG2), which is one of the working groups of the 3GPP, is conducting studies to achieve ultra-reliable and low-latency communications in a fifth generation mobile communication system. For example, in the LTE, a transport block, which is a transmission unit, is generated, at the timing of allocation of a radio resource, by deriving one or more RLC-PDUs in an amount corresponding to the amount of radio resources allocated, adding a MAC header to each RLC-PDU, and coupling the RLC-PDUs. In contrast, in the fifth generation mobile communication system, an approach has been proposed that shortens the processing time of generating a transport block by executing preprocessing such as adding a MAC header to a RLC-PDU before the timing at which the allocation of radio resources is actually performed.

Examples of the related art include:
3GPP TS36.300 V14.3.0 (June 2017);
3GPP TS36.211 V14.3.0 (June 2017);
3GPP TS36.212 V14.3.0 (June 2017);
3GPP TS36.213 V14.3.0 (June 2017);
3GPP TS36.214 V14.2.0 (March 2017);
3GPP TS36.321 V14.3.0 (June 2017);
3GPP TS36.322 V14.0.0 (March 2017);
3GPP TS36.323 V14.3.0 (June 2017);
3GPP TS36.331 V14.3.0 (June 2017);
3GPP TS36.413 V14.3.0 (June 2017);
3GPP TS36.423 V14.3.0 (June 2017);
3GPP TS36.425 V14.0.0 (March 2017);
3GPP TR36.912 V14.0.0 (March 2017);
3GPP TR38.913 V14.3.0 (June 2017);
3GPP TR38.801 V14.0.0 (March 2017);
3GPP TR38.802 V14.1.0 (June 2017);

3GPP TR38.803 V14.1.0 (June 2017);
3GPP TR38.804 V14.0.0 (March 2017);
3GPP TR38.900 V14.3.1 (July 2017);
3GPP TS38.300 V1.0.0 (September 2017);
3GPP TS37.340 V1.0.0 (September 2017);
3GPP TS38.201 V1.0.0 (September 2017);
3GPP TS38.202 V1.0.0 (September 2017);
3GPP TS38.211 V1.0.0 (September 2017);
3GPP TS38.212 V1.0.0 (September 2017);
3GPP TS38.213 V1.0.0 (September 2017);
3GPP TS38.214 V1.0.0 (September 2017);
3GPP TS38.215 V1.0.0 (September 2017);
3GPP TS38.321 V1.0.0 (September 2017);
3GPP TS38.322 V1.0.0 (September 2017);
3GPP TS38.323 V0.3.0 (August 2017);
3GPP TS37.324 V0.2.0 (September 2017);
3GPP TS38.331 V0.0.5 (August 2017);
3GPP TS38.401 V0.2.0 (July 2017);
3GPP TS38.410 V0.4.0 (September 2017);
3GPP TS38.413 V0.3.0 (August 2017);
3GPP TS38.420 V0.2.0 (July 2017);
3GPP TS38.423 V0.2.0 (June 2017);
3GPP TS38.470 V0.3.0 (September 2017);
3GPP TS38.473 V0.3.0 (September 2017);
ITU-R: "IMT Vision—Framework and overall objectives of the future development of IMT for 2020 and beyond", Recommendation ITU-R M.2083-0, September 2015, <http://www.itu.int/dms_pubrec/itu-r/rec/m/R-REC-M.2083-0-201509-I!!PDF-E.pdf>; and Ericsson: "Report from [95 #26] Concatenation" 3GPP TSG-RAN WG2 #95bis, R2-166904, 30 Sep. 2016, <http://www.3gpp.org/ftp/TSG_RAN/WG2_RL2/TSGR2_95bis/Docs/R2-166904.zip>.

SUMMARY

According to an aspect of the disclosure, provided is a transmission apparatus configured to transmit a radio signal to a reception apparatus in a radio communication system. For example, the transmission apparatus includes a processing circuit configured to generate a radio signal based on second data obtained by sequentially processing first data addressed to the reception apparatus from an upper layer to a lower layer, each of the upper layer and the lower layer being a procedure of a protocol stack in which functions for radio communications are divided into a plurality of layers, wherein the processing circuit is further configured to: execute preprocessing configured to start generating the second data before an amount of radio resources to be allocated to the reception apparatus is determined; execute first processing when the amount of radio resources to be allocated to the reception apparatus is determined, the first processing being configured to generate the radio signal based on the second data which has an amount corresponding to the amount to be allocated among the second data generated in the preprocessing; and execute second processing that includes performing control such that the amount of the second data generated from the first data is below a first threshold in the preprocessing.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
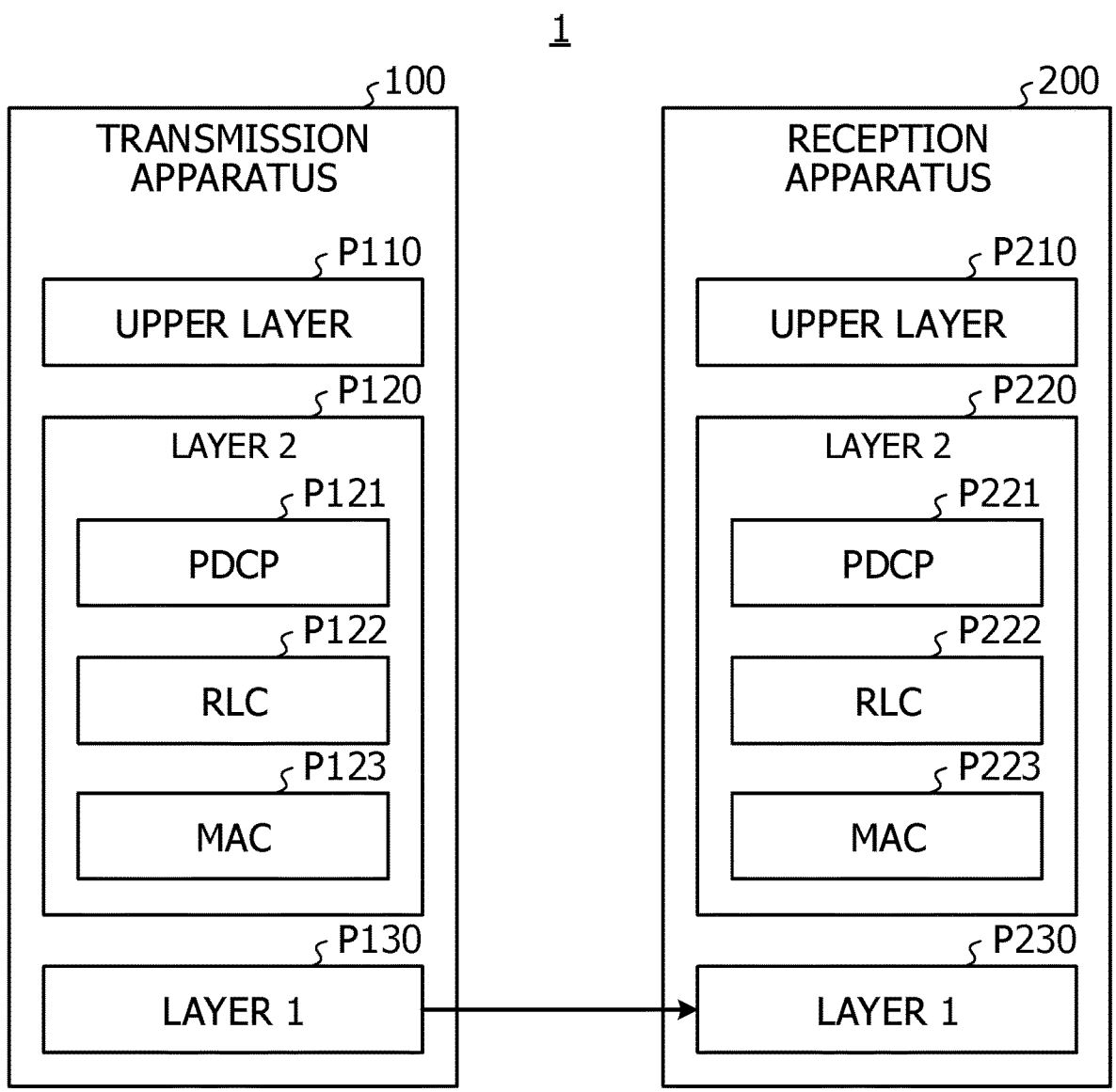
FIG. 1 illustrates an overview of a communication protocol stack in a radio communication system according to Example 1.

The above discussion in the fifth generation mobile communication system has just been started. Thus, it is considered that the basic system design will be mainly discussed for now. For this reason, a technique which may be properly implemented in an operator has not been sufficiently studied yet. For example, the actual situation is that there is not much discussion about implementation problems which could occur in the case of executing the above-described preprocessing to achieve ultra-reliable and low-latency communications. It is noted that the preprocessing may be referred to as "preliminary processing", "pre-processing", or the like.

The technique disclosed herein has been made in view of the above-described circumstances and an object of the technique is to provide a transmission apparatus, a reception apparatus, and a method that are capable of solving problems that could occur in achieving ultra-reliable and low-latency communications.

According to an aspect of the disclosed techniques, it is possible to solve the inconvenience that would occur due to preprocessing to be started to be executed before allocation of radio resources and more efficiently achieve ultra-reliable and low-latency communications.

As described above, the discussion in the fifth generation mobile communication system has just been started. For this reason, the actual situation is that there is not much discussion made so far about implementation problems which could occur in the case of executing preprocessing (also referred to as preprocessing) such as adding a MAC header to a RLC-PDU before the timing at which the allocation of radio resources is actually performed, in order to achieve ultra-reliable and low-latency communications, for example.

As a result of own studies on implementation problems which could occur in the case of executing the above-described preprocessing, the inventors of the present disclosure found out inconvenience due to the fact that there is no limitation on the amount of data to be subjected to preprocessing because the amount of radio resources to be allocated is not determined.

For example, in a case where every time data is generated in an upper layer such as an application, the data is subjected to preprocessing immediately after the generation, when handover occurs, the data subjected to the preprocessing has to be discarded, so that the resource used for the execution of the preprocessing is wasted. For example, when the preprocessing is not performed on the data to be discarded at the time of occurrence of handover, the operating power may be saved for the preprocessing.

The amount of transmission data accumulated in the buffer of the PDCP layer, which is one of the sublayers in the second layer, (which may also be referred to as a PDCP transmission buffer amount or a second buffer amount) has been used as an index value for determining whether or not to execute dual connectivity. The inheritance of such implementation has also been discussed in the fifth generation mobile communication system. However, when the preprocessing is executed immediately on data generated in an upper layer, the PDCP transmission buffer amount becomes substantially zero and fails to function as the index value for the above-described determination.

The inventors of the present disclosure have had unique finding that the inconvenience due to the fact that there is no limitation on the amount of data to be subjected to the above-described preprocessing could become an obstacle in achieving ultra-reliable and low-latency communications.

Hereinafter, modes for carrying out the present disclosure (hereinafter, also referred to as Embodiments and Examples) will be described with reference to the drawings. The configuration of the embodiment which will be described below represents one example for embodying the technical idea of the present disclosure. It is not intended to limit the present disclosure to the configuration of this embodiment. The configuration of the embodiment may be equally applied to other embodiments falling within the scope of the claims. For example, names of various layers such as PDCP, RLC, and MAC may be changed in future development of specifications of the fifth generation mobile communication system. It is also considered that the names of the layers may be changed regarding a mobile communication system of the sixth generation mobile communication system or later. In the following disclosure, names of layers such as PDCP, RLC, and MAC are used as examples of layers in a protocol stack for radio communications. It is to be noted however that it is not intended to limit layers to those of these names.

Example 1

In a radio communication system 1 according to Example 1, a limitation is set in a transmission apparatus capable of transmitting radio signals to a reception apparatus such that the processing amount of preprocessing is below a first threshold, the preprocessing being processing to be executed before the amount of a radio resource to be allocated to the reception apparatus is determined. For example, the first threshold has an aspect as a reference value for controlling the amount of data to be generated through the preprocessing. Such limitation on the preprocessing may be applied to the uplink or may be applied to the downlink. In the case where the limitation is applied to the uplink, the transmission apparatus is a radio terminal (also referred to as a user equipment (UE)) and the reception apparatus is a base station (BS) (also referred to as an access point (AP)). In the case where the limitation is applied to the downlink, the transmission apparatus is a base station and the reception apparatus is a radio terminal.

FIG. 1 illustrates an overview of a communication protocol stack in the radio communication system 1 according to Example 1. The radio communication system 1 illustrated in FIG. 1 includes a transmission apparatus 100 and a reception apparatus 200. The transmission apparatus 100 includes an upper layer (Upper Layer) P110, a second layer (Layer 2) P120, and a first layer (Layer 1) P130. The first layer is an example of the lowermost layer in the communication protocol stack. The second layer P120 of the transmission apparatus 100 includes a first sublayer (a Packet Data Convergence Protocol (PDCP) layer) P121, a second sublayer (a radio link control (RLC) layer) P122, and a third sublayer (a medium access control (MAC) layer) P123. Note that the names of the respective layers are examples and may be changed in development of specifications of the fifth generation mobile communication system or later.

The second layer P120 of the transmission apparatus 100 generates second data by executing, in the first sublayer P121, the second sublayer P122, and the third sublayer P123, processes corresponding to these layers in this order on data (also referred to as first data) addressed to the reception apparatus 200, which is supplied from the upper layer P110.

The first layer P130 of the transmission apparatus 100 generates a radio signal based on the second data generated in the second layer P120 and transmits the radio signal via a radio communication circuit. In this way, the radio signal containing data addressed to the reception apparatus 200 is transmitted to the reception apparatus 200.

The reception apparatus 200 includes an upper layer (Upper Layer) P210, a second layer (Layer 2) P220, and a first layer (Layer 1) P230. The second layer P220 of the reception apparatus 200 includes a first sublayer (a Packet Data Convergence Protocol (PDCP) layer) P221, a second sublayer (a radio link control (RLC) layer) P222, and a third sublayer (a medium access control (MAC) layer) P223.

The first layer P230 of the reception apparatus 200 receives a radio signal (also referred to as a reception signal) from the transmission apparatus 100 via the radio communication circuit, and executes the process corresponding to the first layer P230 on the reception signal to extract the second data from the reception signal.

The second layer P220 of the reception apparatus 200 executes, in the third sublayer P223, the second sublayer P222, and the first sublayer P221, the processes corresponding to these sublayers in this order on the second data extracted by the first layer P230 to reassemble the first data. The second layer P220 of the reception apparatus 200 supplies the first data thus reassembled to the upper layer P210. In this way, the first data supplied from the upper layer P110 of the transmission apparatus 100 is supplied to the upper layer P210 of the reception apparatus 200 through the radio communication.

Figure 2:
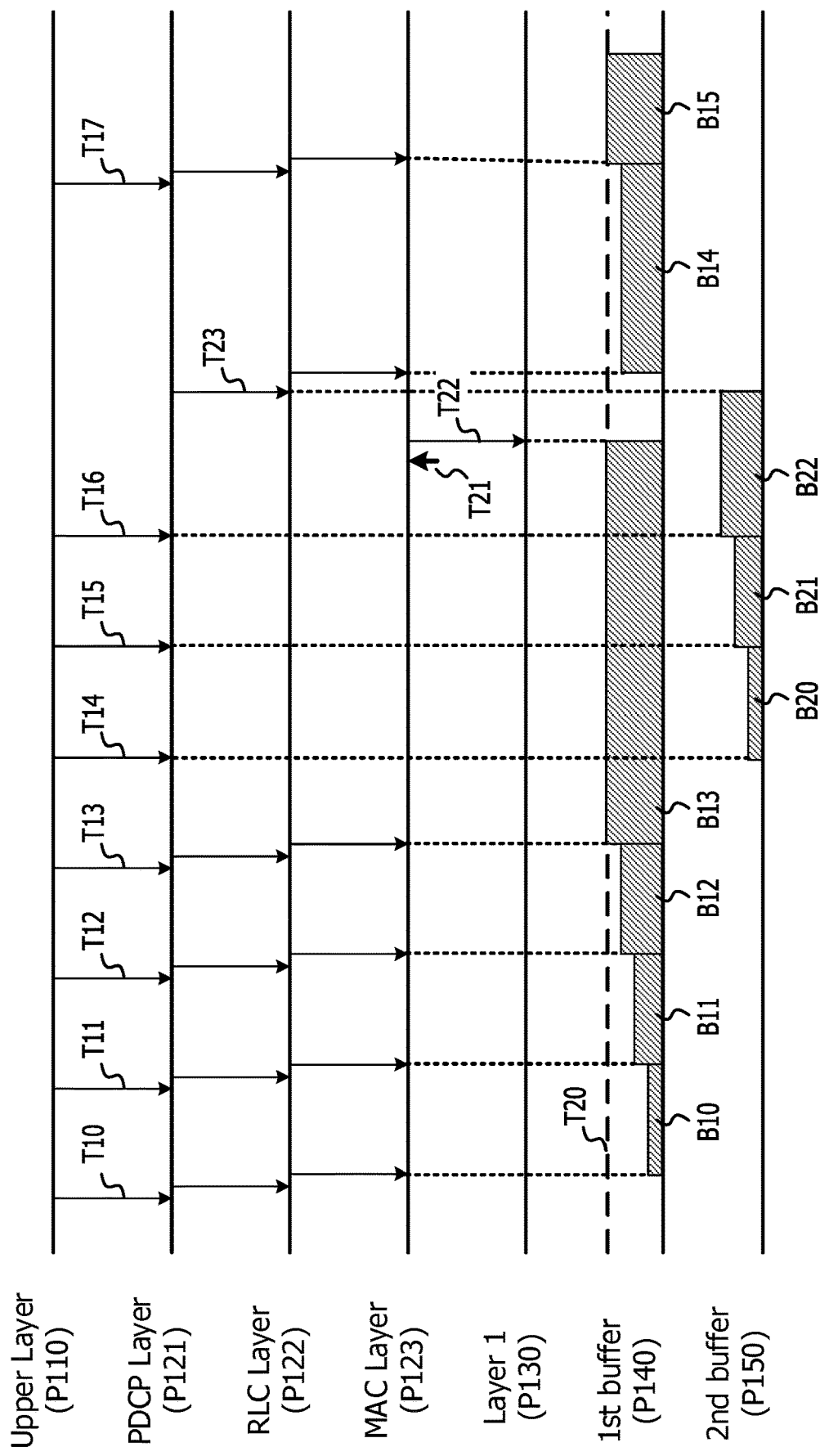
FIG. 2 illustrates an overview of preprocessing in a transmission apparatus according to Example 1.

FIG. 2 illustrates an overview of the preprocessing in the transmission apparatus 100 according to Example 1. In the example of FIG. 2, when the first data is supplied from the upper layer P110 of the transmission apparatus 100 to the first sublayer P121 (T10), the preprocessing is executed, so that the first data is subjected to the processes in the first sublayer P121, the second sublayer P122, and the third sublayer P123 sequentially in this order to be converted into the second data, which is then stored in a first buffer P140 (B10). The first buffer P140 has an aspect as a buffer in which the second data resulting from the preprocessing is stored.

When the first data is supplied from the upper layer P110 to the first sublayer P121 (T11, T12), the first data is similarly converted into second data through the processes in the first sublayer P121, the second sublayer P122, and the third sublayer P123. The second data is then added to the first buffer P140, so that the amount of the second data (also referred to as a first buffer amount) stored in the first buffer P140 increases (B11, B12). The first buffer amount has an aspect as the amount of second data generated from the first data through the preprocessing.

In the example of FIG. 2, at a time point T13, the first data is supplied from the upper layer P110 to the first sublayer P121, so that the amount of the second data stored in the first buffer P140 reaches a threshold (also referred to as the first threshold) T20 for the preprocessing (B13). At a time point T14, when the first data is supplied from the upper layer P110 to the first sublayer P121, since the first buffer amount has already reached the first threshold, the conversion of the first data into the second data is temporarily stopped. The first data is stored in a second buffer P150 until the first buffer amount becomes below the first threshold (B20).

At a time point T15 and a time point T16, since the first buffer amount has still reached the first threshold at the timing when the first data is supplied from the upper layer P110 to the first sublayer P121, the first data supplied from the upper layer P110 is stored in the second buffer P150 (B21, B22).

In the example of FIG. 2, at a time point T21, the allocation of a radio resource by radio scheduling is given to the third sublayer P123. In this way, the second data corresponding to the amount of radio resources allocated from the first buffer P140 (also referred to as a transport block size) is supplied from the third sublayer P123 to the first layer P130 (T22). As a result, in the example of FIG. 2, the first buffer amount has decreased below the first threshold T20.

At a time point T23, it is detected that the first buffer amount has decreased below the first threshold T20. Depending on the result of the detection, the preprocessing is restarted on the first data stored in the second buffer P150 (T23), and the second data into which the first data in the second buffer P150 has been converted is stored in the first buffer P140 (B14). At a time point T17, since the first buffer amount has not reached the first threshold T20 yet, the preprocessing on the first data supplied from the upper layer P110 is continued and the second data into which the first data at the time point T17 has been converted is added to the first buffer P140 (B15).

As described above, when the first data is supplied from the upper layer P110 to the first sublayer P121, it is judged whether the amount of the second data (also referred to as the first buffer amount) already stored in the first buffer P140 has reached the first threshold or is below the first threshold. In the case where the first buffer amount has reached the first threshold, the transmission apparatus 100 controls to temporarily stop the preprocessing on the first data supplied from the upper layer P110.

In this way, in the case where the first buffer amount has reached the first threshold, the first data supplied from the upper layer P110 is stored in the second buffer P150 without being converted into the second data. In an aspect, it is expected that temporarily stopping the conversion of the first data into the second data may save the operating power by the stop of the conversion processing, for example.

In another aspect, storing the first data in the second buffer P150 makes it possible for the transmission apparatus 100 to judge whether or not to execute the dual connectivity based on the amount of the first data (also referred to as the second buffer amount) stored in the second buffer P150.

Figure 3:
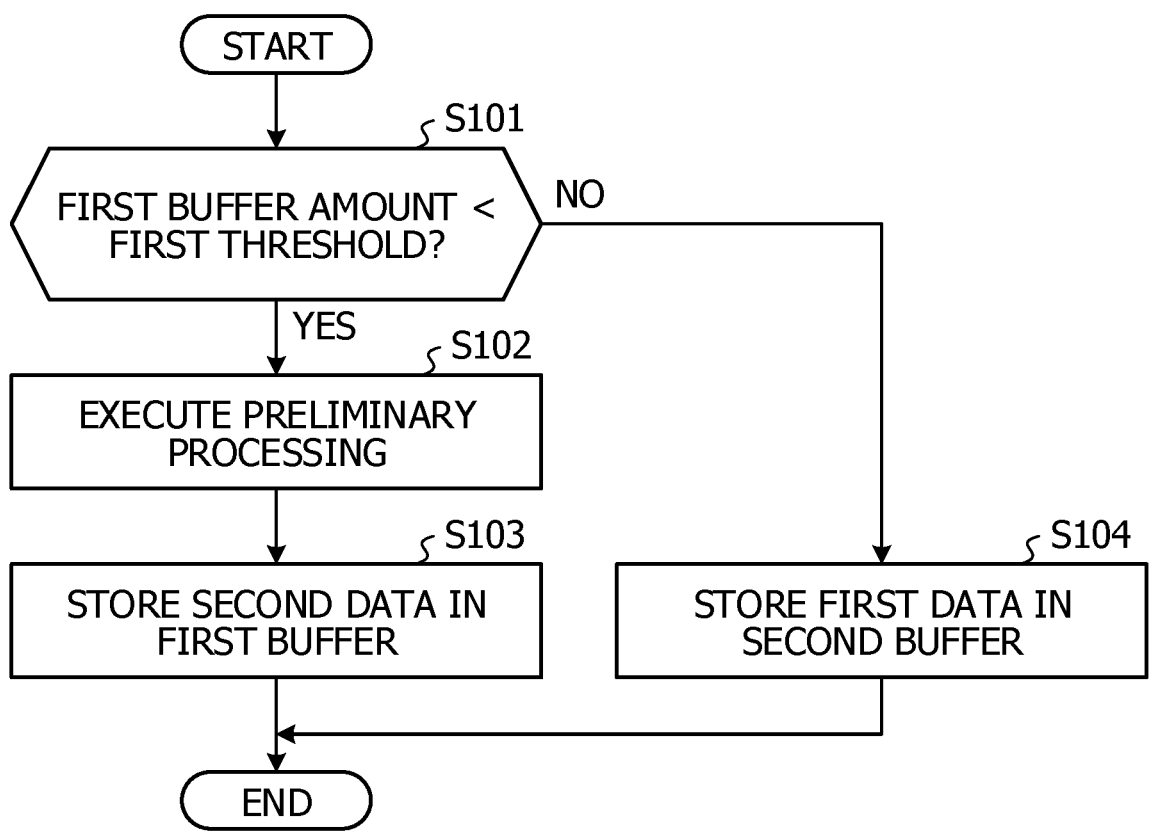
FIG. 3 illustrates an example of a flow of the preprocessing in the transmission apparatus according to Example 1.

FIG. 3 illustrates an example of a flow of the preprocessing in the transmission apparatus 100 according to Example 1. The flow of processing illustrated in FIG. 3 may be started to be executed upon receipt of the first data from the upper layer as a trigger, for example.

The transmission apparatus 100 determines whether the amount of the second data (the first buffer amount) already stored in the first buffer P140 is below the first threshold (S101). The first threshold may be a static threshold set in advance (a fixed value) or may be a dynamic threshold that may be set (updated) based on a signal (which may also be referred to as a first signal) from the reception apparatus during the operation. For example, the first threshold as a static threshold may be determined depending on the capability of the hardware of the transmission apparatus 100. In the example where the transmission apparatus 100 is a radio terminal, the first threshold may be determined based on Capability Information on the radio terminal. The Capability Information on a radio terminal may be referred to as UE Category. In this case, the first threshold may be determined by multiplying the buffer size as a capability value defined by the UE Category by a certain coefficient (for example, 0.8, 0.9, 1.0, 1.1, 1.2, or the like).

When the first buffer amount is determined to be below the first threshold (YES in S101), the transmission apparatus 100 executes the preprocessing on the first data supplied from the upper layer (S102). The transmission apparatus 100 stores the second data generated from the first data through the preprocessing in the first buffer P140 (S103). In this way, the first buffer amount increases.

On the other hand, when the first buffer amount is determined to be more than or equal to the first threshold (NO in S101), the transmission apparatus 100 stores the first data in the second buffer P150 without executing the preprocessing on the first data supplied from the upper layer (S104). Note that the first data may be stored in the second buffer P150 also when the preprocessing is executed.

With the flow of processing described above, the limitation is provided on the amount of data to be subjected to the preprocessing. This makes it possible to solve the inconvenience that would occur in the case where the preprocessing is executed on the first data supplied from the upper layer with no limitation and to more efficiently achieve ultra-reliable and low-latency communications.

Example 2

In a radio communication system 1 according to Example 2, a first threshold for limiting the amount of data to be subjected to preprocessing is dynamically set (updated) by signaling in a first layer. The first layer is an example of the lowermost layer in the communication protocol stack. Hereinafter, an example will be described where downlink control information (DCI) (which may also be referred to as a downlink control signal or a first signal), which is transmitted in a Physical Downlink Control CHannel (PDCCH) or an Extended-PDCCH (E-PDCCH), is used, as an example of signaling in the first layer. In this case, the transmission apparatus 100 is a radio terminal (UE) and the reception apparatus 200 is a base station (BS). The present example is not limited to this, the signaling in the first layer may be an uplink control information (UCI) (which may also be referred to as an uplink control signal or a first signal).

Figure 4:
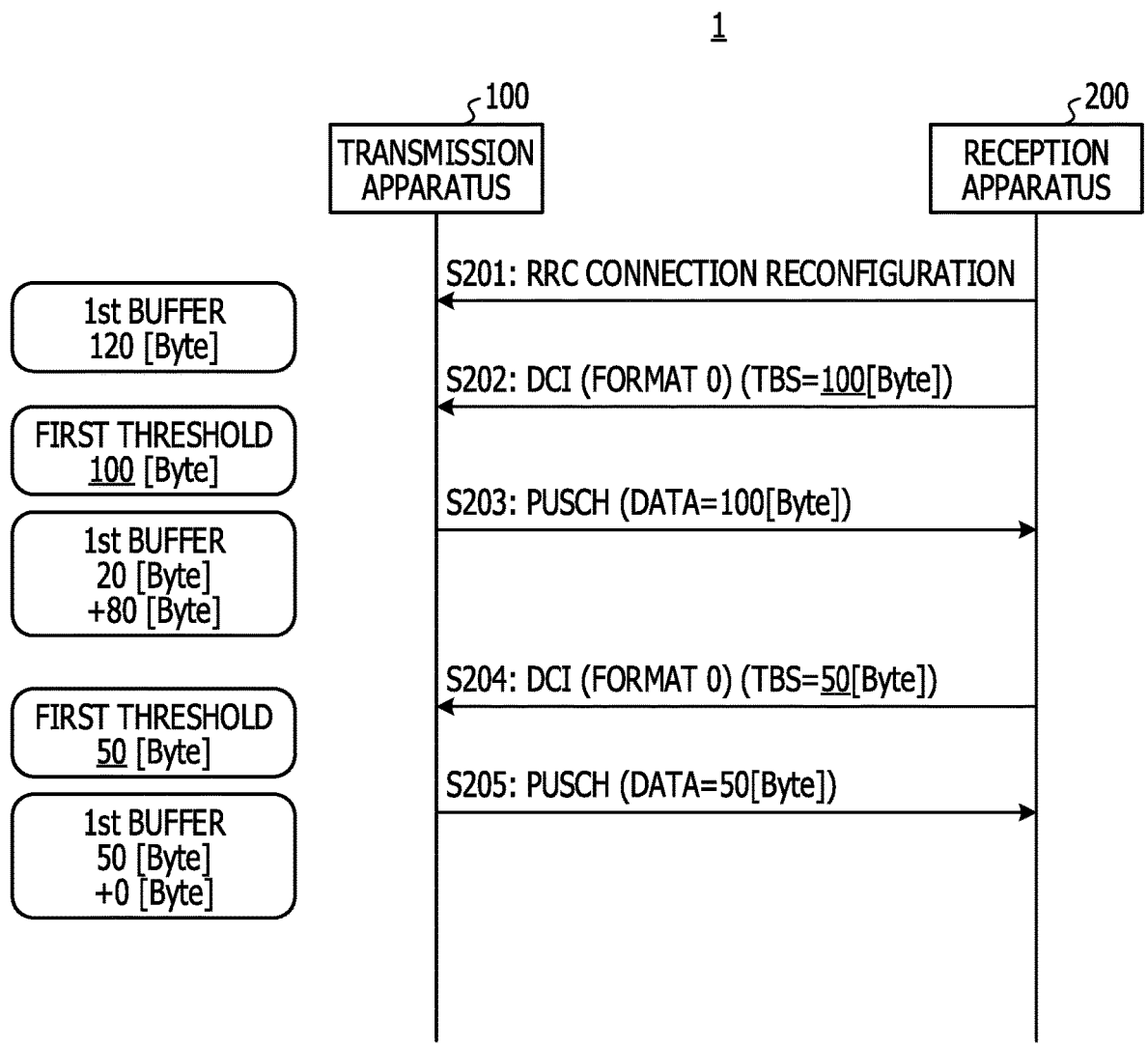
FIG. 4 illustrates an example of a setting sequence of a first threshold conducted by first layer signaling in a radio communication system according to Example 2.

FIG. 4 illustrates an example of a setting sequence of a first threshold conducted by first layer signaling in the radio communication system 1 according to Example 2. When establishing coupling with the reception apparatus 200, the transmission apparatus 100 receives an RRC message (RRC Connection Reconfiguration) from the reception apparatus 200 (S201). The transmission apparatus 100 may set Signaling Radio Bearer (SRB) and Data Radio Bearer (DRB) based on various types of information contained in the RRC Connection Reconfiguration from the reception apparatus 200. The transmission apparatus 100 may transmit an RRC message (RRC Connection Reconfiguration Complete) to the reception apparatus 200.

FIG. 4 illustrates a case where after the transmission apparatus 100 receives an RRC message from the reception apparatus 200 (S201), the amount of the second data (the first buffer amount) stored in the first buffer P140 of the transmission apparatus 100 is 120 [byte]. This is because the initial value of the first threshold is set to 120 [byte]. In other words, it may suffice that the first threshold is set to a certain value.

The reception apparatus 200 notifies the transmission apparatus 100 of the amount of radio resources allocated (also referred to as the transport block size) by the signaling in the first layer (S202). In S202, the reception apparatus 200 may use DCI Format0 as the signaling in the first layer. For example, the notification of the amount of radio resources allocated may be made using a Resource Block Assignment or modulation and coding scheme (MCS) index in DCI (Format0).

In the example of FIG. 4, in S202, the transmission apparatus 100 is notified that the amount of radio resources allocated to data addressed to the reception apparatus 200 (TBS) is 100 [byte].

The transmission apparatus 100 sets (updates) the first threshold based on the amount of radio resources allocated the transmission apparatus 100 is notified of by the signaling in the first layer. In the example of FIG. 4, the first threshold is set to 100 [byte] based on the amount to be allocated (TBS=100 [byte]) given in S202. The first threshold does not necessarily have to be set to the same value as the amount of radio resources allocated given by the signaling in the first layer, but may be determined using a value obtained by multiplying the amount to be allocated given by a certain coefficient (for example, 0.8, 0.9, 1.0, 1.1, 1.2, or the like).

In S203, the transmission apparatus 100 transmits data addressed to the reception apparatus 200 based on the amount to be allocated, wherein the amount to be allocated has been notified in S202. In S203, the transmission apparatus 100 may transmit data addressed to the reception apparatus 200 using the Physical Uplink Shared CHannel (PUSCH), for example. In the example of FIG. 4, the second data of 100 [byte] that corresponds to the amount to be allocated given in S202 among the second data stored in the first buffer P140 is transmitted from the transmission apparatus 100 to the reception apparatus 200.

As a result, 100 [byte] is subtracted from 120 [byte], so that the first buffer amount becomes 20 [byte]. Since the first threshold is 100 [byte], the first buffer amount after the transmission of data in S203 satisfies the condition that "the first buffer amount <the first threshold".

When the first buffer amount is below the first threshold, the transmission apparatus 100 executes the preprocessing on the first data supplied from the upper layer. As a result, in the example of FIG. 4, the second data generated from the first data through the preprocessing is stored in the first buffer P140, and hence the second data of 80 [byte] is added to the first buffer P140, so that the first buffer amount becomes 100 [byte] in total.

The reception apparatus 200 notifies the transmission apparatus 100 of the amount of radio resources allocated through the radio scheduling, by the signaling in the first layer (S204). In the example of FIG. 4, the amount to be allocated (TBS=50 [byte]), which is smaller than the previous amount to be allocated (TBS=100 [byte]), is given.

The transmission apparatus 100 sets (or updates) the first threshold based on the amount of radio resources allocated, wherein the amount of radio resources allocated has been notified by the signaling in the first layer. In the example of FIG. 4, the first threshold is set to 50 [byte] based on the amount to be allocated (TBS=50 [byte]) given in S204. As in the case of the notification in S202, the first threshold does not necessarily have to be set to the same value as the amount of radio resources allocated given by the signaling in the first layer, but may be determined using a value obtained by multiplying the amount to be allocated given by a certain coefficient (for example, 0.8, 0.9, 1.0, 1.1, 1.2, or the like) (the same applies below).

The transmission apparatus 100 transmits data addressed to the reception apparatus 200 based on the amount to be allocated, wherein the amount to be allocated has been notified in S204 (S205). In S205, the transmission apparatus 100 may transmit data addressed to the reception apparatus 200 using the Physical Uplink Shared CHannel (PUSCH), for example. In the example of FIG. 4, the second data of 50 [byte] that corresponds to the amount to be allocated given in S204 among the second data stored in the first buffer P140 is transmitted from the transmission apparatus 100 to the reception apparatus 200.

As a result, 50 [byte] is subtracted from 100 [byte], so that the first buffer amount becomes 50 [byte]. Since the first threshold is 50 [byte], the first buffer amount after the transmission of data in S205 does not satisfy the condition that "the first buffer amount <the first threshold". When the first buffer amount is more than or equal to the first threshold, the transmission apparatus 100 stops the preprocessing on the first data supplied from the upper layer and stores the first data in the second buffer P150. As a result, in the example of FIG. 4, new second data through the preprocessing is not stored in the first buffer P140, so that the first buffer amount remains 50 [byte].

In the above-described example of setting sequence, the first threshold is set based on the amount of radio resources allocated given by the signaling in the first layer. As described above, by causing the first threshold to follow the amount of radio resources allocated given by the signaling in the first layer, it is possible to allow the first threshold to follow the radio scheduling reflecting the radio quality between the transmission apparatus 100 and the reception apparatus 200, and the like. As a result, in accordance with the state of the radio scheduling reflecting the radio quality between the transmission apparatus 100 and the reception apparatus 200, and the like, it is possible to appropriately adjust the amount of processing in the preprocessing. Such an action is useful in appropriately achieving ultra-reliable and low-latency communications.

Modification of Example 2

Although in the example of FIG. 4, an example of setting the first threshold based on a single time of signaling in the first layer has been described, the present example is not limited to this. For example, the first threshold may be set based on a value obtained by performing statistical processing such as weighted average processing on the amount of radio resources allocated given by a plurality of times of signaling.

Example 3

In a radio communication system 1 according to Example 3, the first threshold is dynamically configured (changed) by a Radio Resource Control (RRC) signaling. Hereinafter, as an example of the RRC signaling used for configuring the first threshold, an example using a RRC Connection Reconfiguration message (which may also be referred to as a first signal) will be described. In this case, the transmission apparatus 100 is a radio terminal (UE) and the reception apparatus 200 is a base station (BS). In Example 3, the RRC signaling used for setting the first threshold is not limited to this example, and another RRC message (for example, a RRC Connection Setup) may be used.

Figure 5:
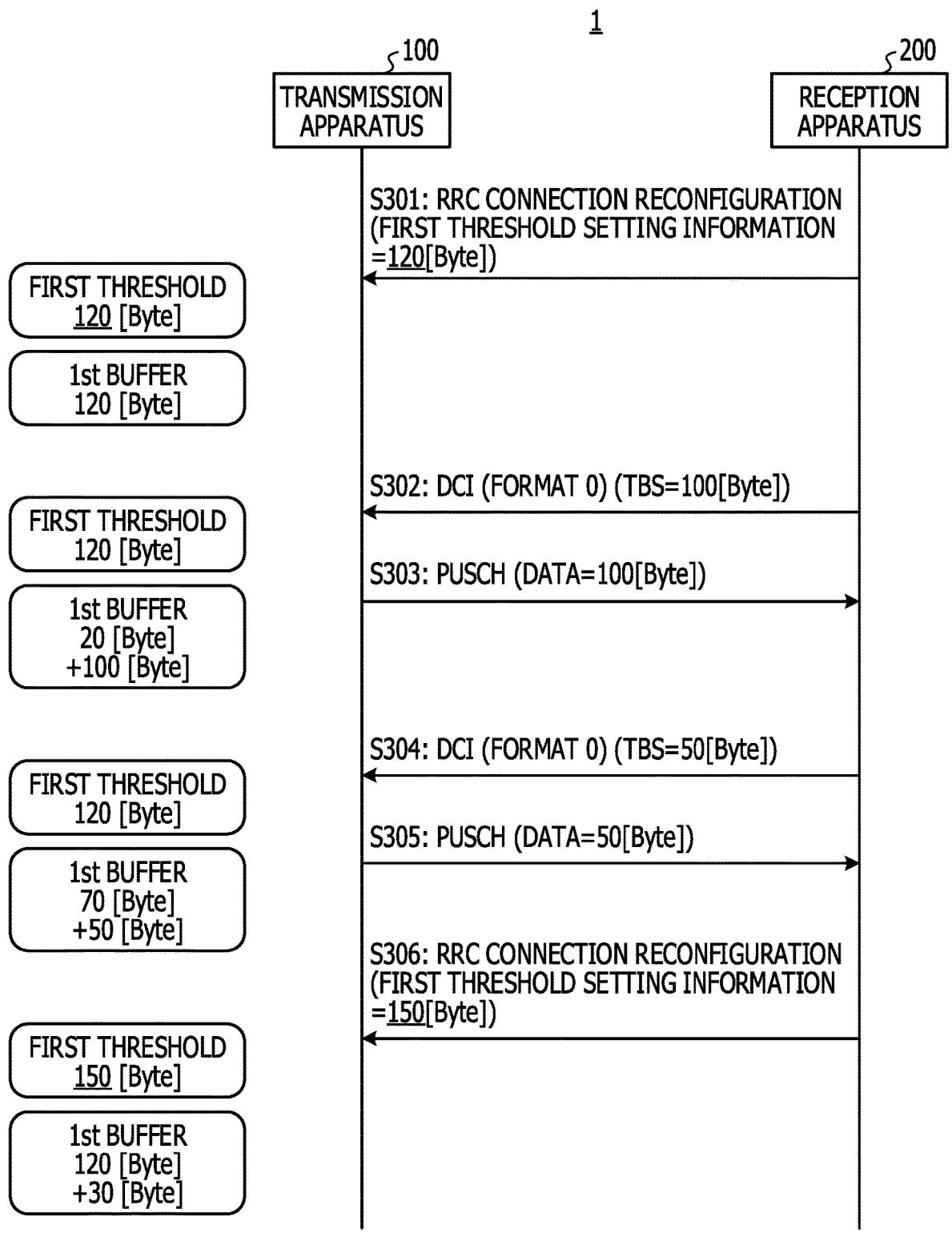
FIG. 5 illustrates an example of a setting sequence of a first threshold conducted by RRC signaling in a radio communication system according to Example 3.

FIG. 5 illustrates an example of a setting sequence of a first threshold conducted by RRC signaling in the radio communication system 1 according to Example 3. When establishing connecting with the transmission apparatus 100, the reception apparatus 200 transmits a RRC message (RRC Connection Reconfiguration) (S301). In S301, the reception apparatus 200 stores first threshold setting information in the RRC message addressed to the transmission apparatus 100. In other words, the RRC message according to Example 3 contains the first threshold setting information as one of information elements.

The first threshold setting information contains information to be used in setting the first threshold in the transmission apparatus 100. An example of the first threshold setting information includes the value of the first threshold itself to be used in the transmission apparatus 100. Alternatively, "ul_DataSplitThreshold", which is a threshold (which may also be referred to as a second threshold) used in determining whether or not to execute dual connectivity may be stored as the first threshold setting information. In this case, the transmission apparatus 100 may set the second threshold and also set the first threshold based on "ul_DataSplitThreshold" stored in the RRC message. At this time, a value obtained by multiplying "ul_DataSplitThreshold" by a certain coefficient (for example, 0.8, 0.9, 1.0, 1.1, 1.2, or the like) may be used as the first threshold. A coefficient to be multiplied with a certain value (for example, a buffer amount, the second threshold, or the like which is determined based on the terminal performance information (which may also be referred to as UE Category) when the first threshold is determined in the transmission apparatus 100 may be stored in the RRC message as the first threshold setting information.

In FIG. 5, the transmission apparatus 100 receives the first threshold setting information prompting the first threshold to be set to 120 [byte] from the reception apparatus 200 by RRC signaling. Based on the first threshold setting information received in S301, the transmission apparatus 100 sets the first threshold to 120 [byte].

Thereafter, when the first buffer amount is below the first threshold, the transmission apparatus 100 generates second data from the first data supplied from the upper layer through the preprocessing and stores the second data generated through the preprocessing in the first buffer P140. In this way, the first buffer amount increases. In FIG. 5, the first buffer amount in the transmission apparatus 100 is 120 [byte], which is the same value as the first threshold.

Next, in the same manner as in Example 2, the reception apparatus 200 notifies the transmission apparatus 100 of the amount of radio resources allocated (also referred to as the transport block size) by the signaling in the first layer (S302). In S302, the reception apparatus 200 may use DCI Format0 as the signaling in the first layer. For example, the notification of the amount of radio resources allocated may be made using a Resource Block Assignment or modulation and coding scheme (MCS) index in DCI (Format0).

In the example of FIG. 5, in S302, the transmission apparatus 100 is notified that the amount of radio resources allocated to data addressed to the reception apparatus 200 (TBS) is 100 [byte]. However, in Example 3, the first threshold in the transmission apparatus 100 remains to be 120 [byte].

The transmission apparatus 100 transmits data addressed to the reception apparatus 200 based on the amount to be allocated, wherein the amount to be allocated has been notified in S302 (S303). In S303, the transmission apparatus 100 may transmit data addressed to the reception apparatus 200 using the Physical Uplink Shared CHannel (PUSCH), for example. In the example of FIG. 5, the second data of 100 [byte] that corresponds to the amount to be allocated given in S302 among the second data stored in the first buffer P140 is transmitted from the transmission apparatus 100 to the reception apparatus 200.

As a result, 100 [byte] is subtracted from 120 [byte], so that the first buffer amount becomes 20 [byte]. Since the first threshold is 120 [byte], the first buffer amount after the transmission of data in S303 satisfies the condition that "the first buffer amount <the first threshold".

When the first buffer amount is below the first threshold, the transmission apparatus 100 executes the preprocessing on the first data supplied from the upper layer. As a result, in the example of FIG. 5, the second data generated from the first data through the preprocessing is stored in the first buffer P140, and hence the second data of 100 [byte] is added to the first buffer P140, so that the first buffer amount becomes 120 [byte] in total.

The reception apparatus 200 notifies the transmission apparatus 100 of the amount of radio resources allocated through the radio scheduling, by the signaling in the first layer (S304). In the example of FIG. 5, the amount to be allocated (TBS=50 [byte]), which is smaller than the previous amount to be allocated (TBS=100 [byte]), is given. However, in Example 3, the first threshold in the transmission apparatus 100 remains to be 120 [byte].

The transmission apparatus 100 transmits data addressed to the reception apparatus 200 based on the amount to be allocated the transmission apparatus 100 was notified of in S304 (S305). In S305, the transmission apparatus 100 may transmit data addressed to the reception apparatus 200 using the Physical Uplink Shared CHannel (PUSCH), for example. In the example of FIG. 5, the second data of 50 [byte] that corresponds to the amount to be allocated given in S304 among the second data stored in the first buffer P140 is transmitted from the transmission apparatus 100 to the reception apparatus 200.

As a result, 50 [byte] is subtracted from 120 [byte], so that the first buffer amount becomes 70 [byte]. Since the first threshold is 120 [byte], the first buffer amount after the transmission of data in S305 satisfies the condition that "the first buffer amount <the first threshold".

When the first buffer amount is below the first threshold, the transmission apparatus 100 executes the preprocessing on the first data supplied from the upper layer. As a result, in the example of FIG. 5, the second data generated from the first data through the preprocessing is stored in the first buffer P140, and hence the second data of 50 [byte] is added to the first buffer P140, so that the first buffer amount becomes 120 [byte] in total.

The reception apparatus 200 may transmit, by RRC signaling, to the transmission apparatus 100, first threshold setting information that indicates the first threshold to be updated, in response to change in the radio quality between the transmission apparatus 100 and the reception apparatus 200, or the like (S306). In S306 of FIG. 5, the reception apparatus 200 transmits, to the transmission apparatus 100, the first threshold setting information that indicates the first threshold in the transmission apparatus 100 to be set to 150 [byte], by RRC signaling.

The transmission apparatus 100 updates (sets) the first threshold based on the first threshold setting information received from the reception apparatus 200 by RRC signaling. In the example of FIG. 5, based on the first threshold setting information received in S306, the transmission apparatus 100 sets the first threshold to 150 [byte]. As a result, the first buffer amount satisfies the condition that "the first buffer amount <the first threshold".

When the first buffer amount is below the first threshold, the transmission apparatus 100 executes the preprocessing on the first data supplied from the upper layer. As a result, in the example of FIG. 5, the second data generated from the first data through the preprocessing is stored in the first buffer P140, and hence the second data of 30 [byte] is added to the first buffer P140, so that the first buffer amount becomes 150 [byte] in total.

In the above-described example of setting sequence, the first threshold is set based on the first threshold setting information given by the RRC signaling. In this way, by giving the first threshold setting information used in setting the first threshold by RRC signaling, it is possible to loosen the cycle of updating the first threshold as compared with the method of setting the first threshold by the signaling in the first layer. Such an action has an aspect of stabilizing the processing amount in the preprocessing because the first threshold is maintained when there is no notification (also referred to as update instruction) of the first threshold setting information by RRC signaling, even when a phenomenon such as a temporary change in the amount of radio resources allocated following an instant change in the radio quality occurs, for example.

Example 4

In a radio communication system 1 according to Example 4, the first threshold is dynamically set (updated) by both of the signaling in the first layer and the RRC signaling. Hereinafter, an example will be described where downlink control information (DCI), which is transmitted in a Physical Downlink Control CHannel (PDCCH) or an Extended-PDCCH (E-PDCCH), is used, as an example of signaling in the first layer. As an example of the RRC signaling used for setting the first threshold, an example using a RRC Connection Reconfiguration message will be described. In this case, the transmission apparatus 100 is a radio terminal (UE) and the reception apparatus 200 is a base station (BS).

Figure 6:
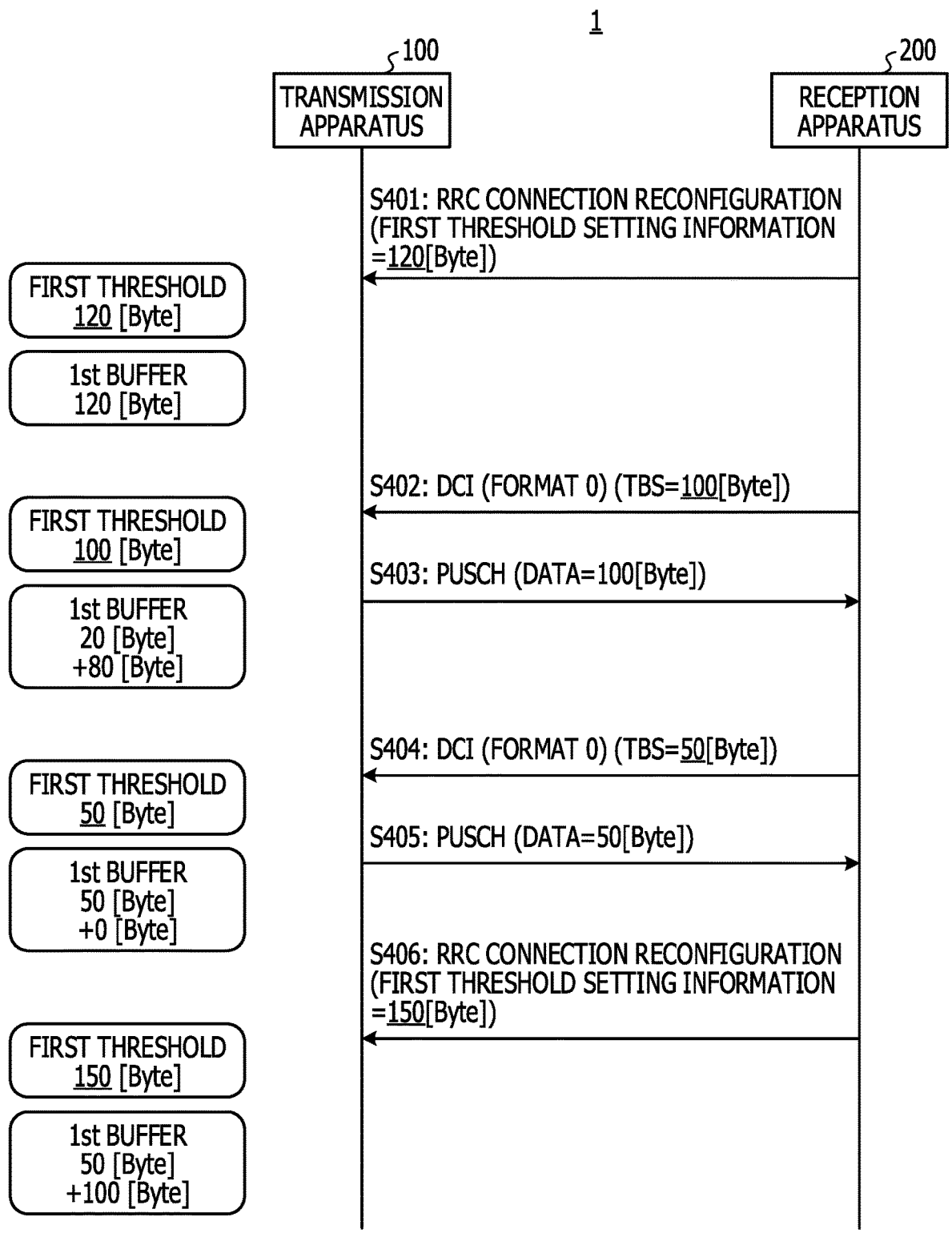
FIG. 6 illustrates an example of a setting sequence of a first threshold conducted by RRC signaling and first layer signaling in a radio communication system according to Example 4.

FIG. 6 illustrates an example of a setting sequence of a first threshold conducted by RRC signaling and first layer signaling in the radio communication system 1 according to Example 4. When establishing connection with the transmission apparatus 100, the reception apparatus 200 transmits a RRC message (RRC Connection Reconfiguration) (S401). In S401, the reception apparatus 200 stores first threshold setting information in the RRC message addressed to the transmission apparatus 100.

The first threshold setting information contains information to be used in setting the first threshold in the transmission apparatus 100. An example of the first threshold setting information includes the value of the first threshold itself to be used in the transmission apparatus 100. Alternatively, "ul_DataSplitThreshold", which is a threshold (which may also be referred to as a second threshold) used in determining whether or not to execute dual connectivity may be stored as the first threshold setting information. In this case, the transmission apparatus 100 may set the second threshold and also set the first threshold based on "ul_DataSplitThreshold" stored in the RRC message. At this time, a value obtained by multiplying "ul_DataSplitThreshold" by a certain coefficient (for example, 0.8, 0.9, 1.0, 1.1, 1.2, or the like) may be used as the first threshold. A coefficient to be multiplied with a certain value (for example, a buffer amount, the second threshold, or the like which is determined based on the terminal performance information (which may also be referred to as UE Category) when the first threshold is determined in the transmission apparatus 100 may be stored in the RRC message as the first threshold setting information.

In FIG. 6, the transmission apparatus 100 receives the first threshold setting information indicating the first threshold to be set to 120 [byte] from the reception apparatus 200 by RRC signaling. Based on the first threshold setting information received in S401, the transmission apparatus 100 sets the first threshold to 120 [byte].

Thereafter, when the first buffer amount is below the first threshold, the transmission apparatus 100 generates second data from the first data supplied from the upper layer through the preprocessing and stores the second data generated through the preprocessing in the first buffer P140. In this way, the first buffer amount increases. In FIG. 6, the first buffer amount in the transmission apparatus 100 is 120 [byte], which is the same value as the first threshold.

Next, the reception apparatus 200 notifies the transmission apparatus 100 of the amount of radio resources allocated (also referred to as the transport block size) by the signaling in the first layer (S402). In S402, the reception apparatus 200 may use DCI Format0 as the signaling in the first layer. For example, the notification of the amount of radio resources allocated may be made using a Resource Block Assignment or modulation and coding scheme (MCS) index in DCI (Format0).

In the example of FIG. 6, in S402, the transmission apparatus 100 is notified that the amount of radio resources allocated to data addressed to the reception apparatus 200 (TBS) is 100 [byte].

The transmission apparatus 100 sets (updates) the first threshold based on the amount of radio resources allocated the transmission apparatus 100 is notified of by the signaling in the first layer. In the example of FIG. 6, the first threshold is set to 100 [byte] based on the amount to be allocated (TBS=100 [byte]) given in S402. The first threshold does not necessarily have to be set to the same value as the amount of radio resources allocated given by the signaling in the first layer, but may be determined using a value obtained by multiplying the amount to be allocated given by a certain coefficient (for example, 0.8, 0.9, 1.0, 1.1, 1.2, or the like).

The transmission apparatus 100 transmits data addressed to the reception apparatus 200 based on the amount to be allocated, wherein the amount to be allocated has been notified in S402 (S403). In S403, the transmission apparatus 100 may transmit data addressed to the reception apparatus 200 using the Physical Uplink Shared CHannel (PUSCH), for example. In the example of FIG. 6, the second data of 100 [byte] that corresponds to the amount to be allocated given in S402 among the second data stored in the first buffer P140 is transmitted from the transmission apparatus 100 to the reception apparatus 200.

As a result, 100 [byte] is subtracted from 120 [byte], so that the first buffer amount becomes 20 [byte]. Since the first threshold is 100 [byte], the first buffer amount after the transmission of data in S403 satisfies the condition that "the first buffer amount <the first threshold".

When the first buffer amount is below the first threshold, the transmission apparatus 100 executes the preprocessing on the first data supplied from the upper layer. As a result, in the example of FIG. 6, the second data generated from the first data through the preprocessing is stored in the first buffer P140, and hence the second data of 80 [byte] is added to the first buffer P140, so that the first buffer amount becomes 100 [byte] in total.

The reception apparatus 200 notifies the transmission apparatus 100 of the amount of radio resources allocated through the radio scheduling, by the signaling in the first layer (S404). In the example of FIG. 6, the amount to be allocated (TBS=50 [byte]), which is smaller than the previous amount to be allocated (TBS=100 [byte]), is given.

The transmission apparatus 100 sets (updates) the first threshold based on the amount of radio resources allocated the transmission apparatus 100 is notified of by the signaling in the first layer. In the example of FIG. 6, the first threshold is set to 50 [byte] based on the amount to be allocated (TBS=50 [byte]) given in S404. As in the case of notification in S402, the first threshold does not necessarily have to be set to the same value as the amount of radio resources allocated given by the signaling in the first layer, but may be determined using a value obtained by multiplying the amount to be allocated given by a certain coefficient (for example, 0.8, 0.9, 1.0, 1.1, 1.2, or the like).

The transmission apparatus 100 transmits data addressed to the reception apparatus 200 based on the amount to be allocated, the amount to be allocated has been notified in S404 (S405). In S405, the transmission apparatus 100 may transmit data addressed to the reception apparatus 200 using the Physical Uplink Shared CHannel (PUSCH), for example. In the example of FIG. 6, the second data of 50 [byte] that corresponds to the amount to be allocated given in S404 among the second data stored in the first buffer P140 is transmitted from the transmission apparatus 100 to the reception apparatus 200.

As a result, 50 [byte] is subtracted from 100 [byte], so that the first buffer amount becomes 50 [byte]. Since the first threshold is 50 [byte], the first buffer amount after the transmission of data in S405 does not satisfy the condition that "the first buffer amount <the first threshold". When the first buffer amount is more than or equal to the first threshold, the transmission apparatus 100 stops the preprocessing on the first data supplied from the upper layer and stores the first data in the second buffer P150. As a result, in the example of FIG. 6, new second data through the preprocessing is not stored in the first buffer P140, so that the first buffer amount remains 50 [byte].

The reception apparatus 200 may transmit, by RRC signaling, to the transmission apparatus 100, first threshold setting information that indicates the first threshold to be updated, in response to change in the radio quality between the transmission apparatus 100 and the reception apparatus 200, or the like (S406). In S406 of FIG. 6, the reception apparatus 200 transmits, by RRC signaling, to the transmission apparatus 100, the first threshold setting information prompting the first threshold in the transmission apparatus 100 to be set to 150 [byte].

The transmission apparatus 100 updates (sets) the first threshold based on the first threshold setting information received from the reception apparatus 200 by RRC signaling. In the example of FIG. 6, based on the first threshold setting information received in S406, the transmission apparatus 100 sets the first threshold to 150 [byte]. As a result, the first buffer amount satisfies the condition that "the first buffer amount <the first threshold".

When the first buffer amount is below the first threshold, the transmission apparatus 100 executes the preprocessing on the first data supplied from the upper layer. As a result, in the example of FIG. 6, the second data generated from the first data through the preprocessing is stored in the first buffer P140, and hence the second data of 100 [byte] is added to the first buffer P140, so that the first buffer amount becomes 150 [byte] in total.

In the above-described example of setting sequence, the first threshold is set based on the first threshold setting information given by the RRC signaling. In this way, by causing the first threshold to follow the amount of radio resources allocated given by the signaling in the first layer, it is possible to allow the first threshold to follow the radio scheduling reflecting the radio quality between the transmission apparatus 100 and the reception apparatus 200, and the like. As a result, in accordance with the state of the radio scheduling reflecting the radio quality between the transmission apparatus 100 and the reception apparatus 200, and the like, it is possible to appropriately adjust the amount of processing in the preprocessing.

In the above-described example of setting sequence, the first threshold is further set based on the amount of radio resources allocated given by the signaling in the first layer. In this way, it is expected to appropriately set the first threshold again by RRC signaling even when the first threshold is updated to an inappropriate value upon an abnormal change in the amount of radio resources allocated following an instant abnormal change in the radio quality.

Modification of Example 4

Although in the setting sequence illustrated in FIG. 6, an example of using notification of the amount of radio resources allocated from the reception apparatus 200 by the first layer signaling (for example, S402, S404) as a trigger for the transmission apparatus 100 transmitting data addressed to the reception apparatus 200 has been described, Example 4 is not limited to this. The same applies to the other examples.

For example, according to the semi-persistent scheduling (SPS) method, which is one of the radio scheduling methods, a single time of notification of the amount of a radio resource allocated is applied not only to 1 subframe (which may also be referred to as Transmission Time Interval (TTI) but also to a plurality of subframes. For example, by periodically allocating a certain radio resource, an overhead used for the notification of the amount of radio resources allocated by the first layer signaling (which may also be referred to as a load) is reduced.

In the case of using the SPS method, the first layer signaling in S404 may be omitted, for example, in the setting sequence illustrated in FIG. 6. In this case, in S405, the transmission apparatus 100 transmits second data of 100 [byte] among the second data stored in the first buffer P140 to the reception apparatus 200.

Any of the above-described examples may employ the SPS method or may employ the dynamic scheduling (DS) method.

Example 5

In a radio communication system 1 according to Example 5, the second threshold used for determination on the selection of a method for radio communications between the transmission apparatus 100 and the reception apparatus 200 is adjusted based on the first threshold. Examples of the method for radio communications include a method in which a single transmission apparatus 100 perform radio communications with a plurality of reception apparatuses 200 (which may also be referred to as multiple connectivity), a method in which a single transmission apparatus 100 performs radio communications with a single reception apparatus 200 (which may also be referred to as single access), and the like.

Figure 7:
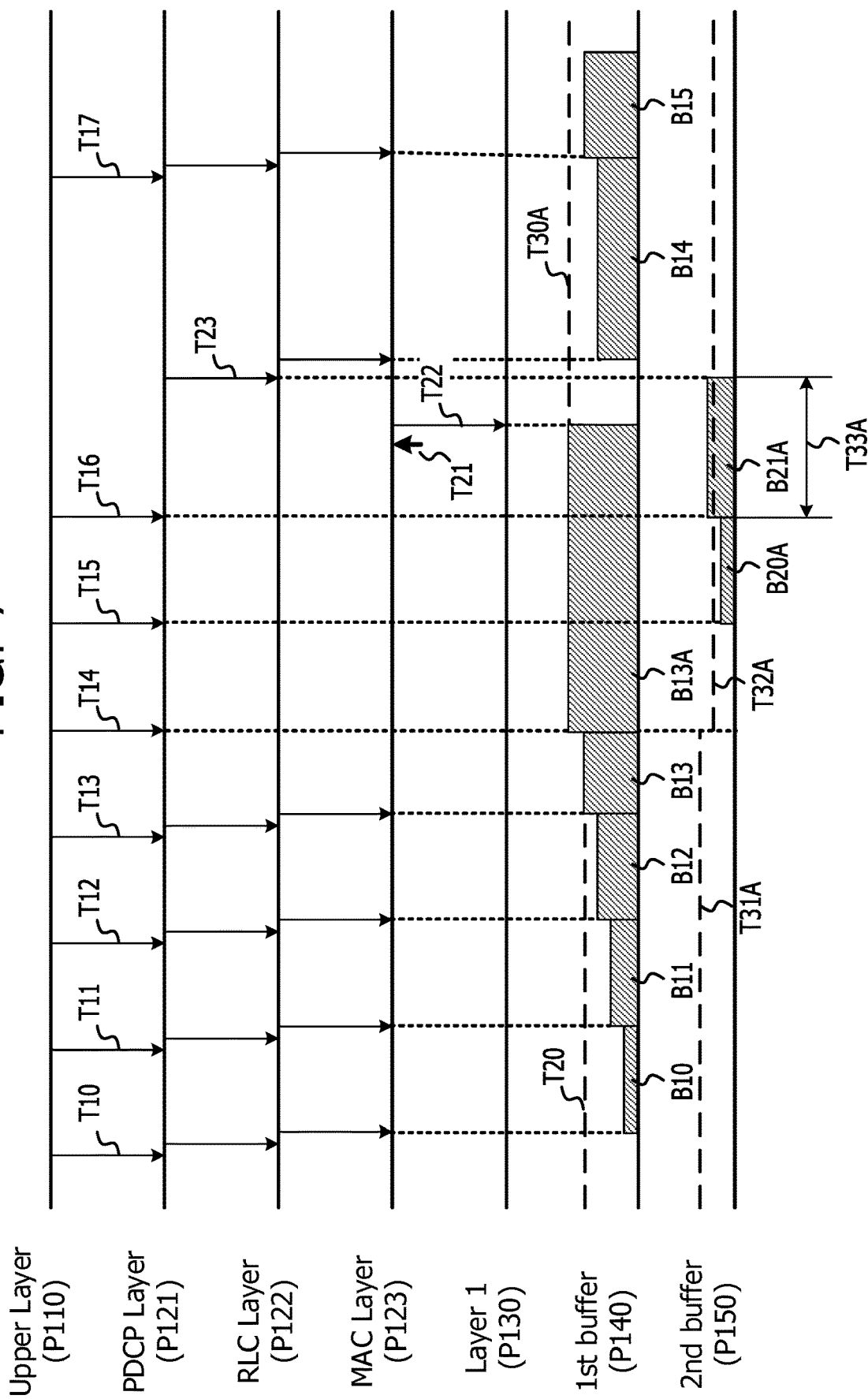
FIG. 7 illustrates an overview of preprocessing in a transmission apparatus according to Example 5.

FIG. 7 illustrates an overview of preprocessing in the transmission apparatus 100 according to Example 5. In FIG. 7, the same portions as those in FIG. 2 are denoted with the same reference signs. Also in the example of FIG. 7, when the first data is supplied from the upper layer P110 of the transmission apparatus 100 to the first sublayer P121 (T10), since the first buffer amount is below the first threshold T20, the preprocessing is executed. As a result, the first data is subjected sequentially to the processes in the first sublayer P121, the second sublayer P122, and the third sublayer P123, thus being converted into the second data, which is then stored in the first buffer P140 (B10).

Also at a time point T11 and a time point T13, the first buffer amount is below the first threshold T20. For this reason, when the first data is supplied from the upper layer P110 to the first sublayer P121 (T11, T12, T13), the second data into which the first data has been converted is added to the first buffer P140 in the same manner. As a result, the amount of the second data stored in the first buffer P140 (also referred to as the first buffer amount) increases (B11, B12, B13).

In the example of FIG. 7, update to the first threshold T30A is made at a time point T14 by the method illustrated in Example 2 or Example 4, or the like. As a result, the preprocessing is executed also on the first data supplied from the upper layer P110 at the time point T14, and the second data into which the first data has been converted is added to the first buffer P140 (B13A).

In the example of FIG. 7, at the time point T14, the second threshold T31A used for determining whether to perform multiple connectivity is updated to a second threshold T32A based on the first threshold T30A after the update. For example, in the case where the first threshold T30A after the update is updated to a value larger than the first threshold T20 before the update, the second threshold T32A after the update may be updated to a value smaller than the second threshold T31A before the update. For example, in the case where the first threshold T30A after the update is updated to a value smaller than the first threshold T20 before the update, the second threshold T32A after the update may be updated to a value larger than the second threshold T31A before the update.

Subsequently, at a time point T15 and a time point T16, since the first buffer amount has reached the first threshold at the timing when the first data is supplied from the upper layer P110 to the first sublayer P121, the first data supplied from the upper layer P110 is stored in the second buffer P150 (1320A, B21A).

As a result, at the time point T16, the first data supplied from the upper layer P110 is stored in the second buffer P150, so that the amount of the first data stored in the second buffer P150 (also referred to as the second buffer amount) exceeds the second threshold T32A after the update. The transmission apparatus 100 may determine to execute the dual connectivity based on the fact that the second buffer amount has exceeded the second threshold T32A.

In the example of FIG. 7, at a time point T22, the second data stored in the first buffer is transmitted, so that the first buffer amount is reduced. At a time point T23, the first buffer amount falls below the first threshold T30A, and the preprocessing is executed on the first data stored in the second buffer, so that the second buffer amount is reduced. As a result, in the example of FIG. 7, the second buffer amount is more than or equal to the second threshold in a time period T33A and thereafter falls below the second threshold.

Upon detecting that the second buffer amount has fallen below the second threshold, the transmission apparatus 100 may end the execution of dual connectivity, which is a coupling method of performing radio communications with a plurality of reception apparatuses 200, and switch to a single access, which is a coupling method of performing radio communications with a single reception apparatus 200.

Modification 1 of Example 5

Although the method of updating the second threshold based on the first threshold has been described in Example 5, the method of updating the second threshold is not limited to this. For example, the transmission apparatus 100 may adjust the second threshold based on the first threshold as described below when comparing the second buffer amount with the second threshold. For example, the transmission apparatus 100 may determine to execute dual connectivity in the case where the second buffer amount satisfies a determination condition that "the second buffer amount ≥(the second threshold−(the first threshold×D))". The coefficient D is a certain value (for example, 0.8, 0.9, 1.0, 1.1, 1.2, or the like) to be multiplied with the first threshold.

Modification 2 of Example 5

Although the control on whether to execute dual connectivity or single access based on the result of comparison between the second buffer amount and the second threshold has been described in Example 5, the present example is not limited to this. For example, based on the result of comparison between the second buffer amount and the second threshold, the transmission apparatus 100 may perform control on whether to execute the Dual Connectivity method (also referred to as the DC method) in which the transmission apparatus 100 transmits different data to a plurality of reception apparatuses 200 or to execute the Duplication method (also referred to as the DP method) in which the transmission apparatus 100 transmits the same data to each of a plurality of reception apparatuses 200.

For example, the transmission apparatus 100 may determine to execute the DP method in the case where the second buffer amount satisfies the determination condition that "the second buffer amount<(the second threshold−(the first threshold×D))". Alternatively, for example, the transmission apparatus 100 may determine to execute the DC method in the case where the second buffer amount does not satisfy the determination condition that "the second buffer amount<(the second threshold−(the first threshold×D))".

In the case of setting the second threshold based on "ul_DataSplitThreshold", the above-described determination condition may be expressed as "the second buffer amount<(ul_DataSplitThreshold−(the first threshold×D))", for example.

Hardware Configuration

Figure 8:
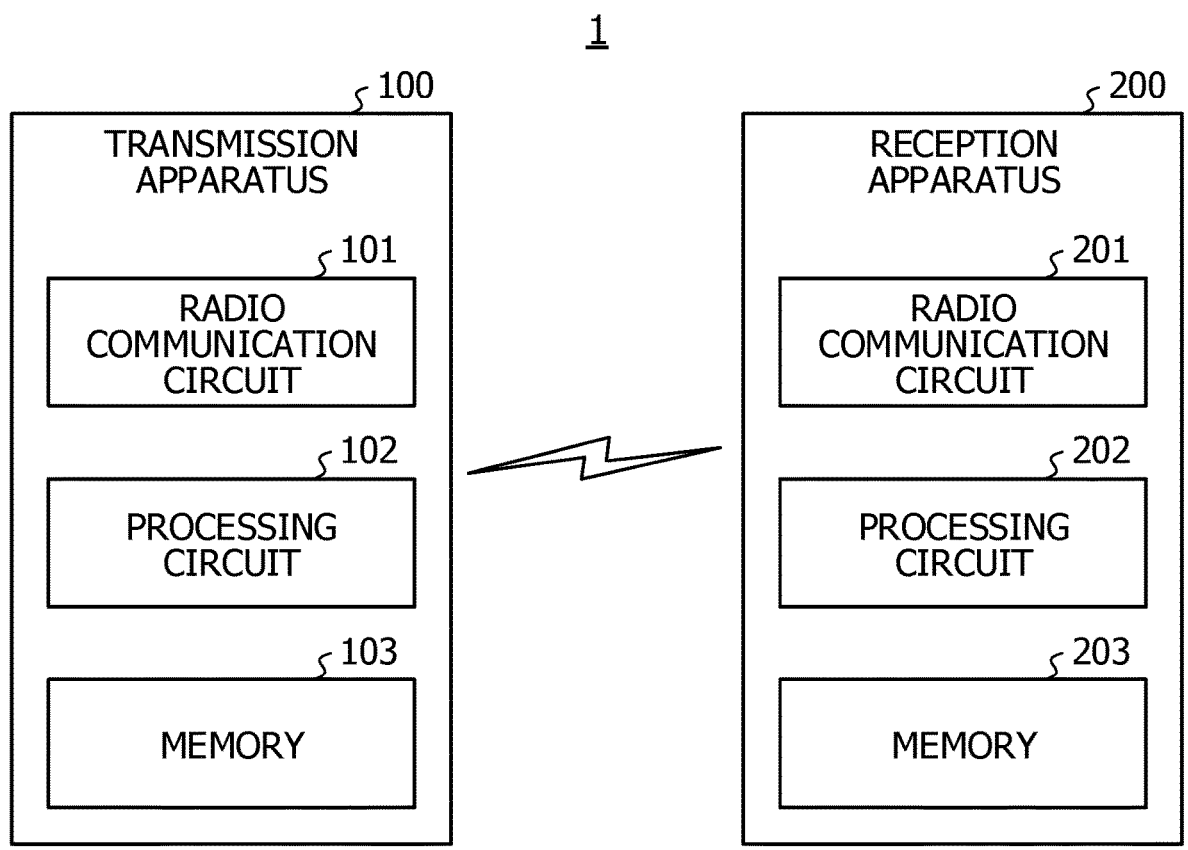
FIG. 8 illustrates examples of hardware configurations of a transmission apparatus and a reception apparatus in a radio communication system.

Finally, a hardware configuration of each apparatus used in the present example will be described briefly. FIG. 8 illustrates examples of hardware configurations of the transmission apparatus 100 and the reception apparatus 200 in the radio communication system 1.

The transmission apparatus 100 illustrated in FIG. 8 includes a radio communication circuit 101, a processing circuit 102, and a memory 103. In the transmission apparatus 100 illustrated in FIG. 8, illustrations of some components such as an antenna are omitted. When the transmission apparatus 100 is a radio terminal, the transmission apparatus 100 may include, for example, a display device such as a liquid crystal display, an input device such as a touch panel, and a battery such as a lithium-ion rechargeable battery.

When the transmission apparatus 100 is a base station, the transmission apparatus 100 may include a wired communication circuit that converts information into packet data with a format that is suitable to be output to another apparatus and transmits the packet data to another device, or extracts data or the like from a packet data received from another apparatus and outputs the data to the memory 103 or the processing circuit 102. An example of another apparatus may be another base station apparatus, a Mobility Management Entity (MME), a Serving Gateway (SGW), or the like. The MME and the SGW are also referred to as a core node, and a logical communication interface used for communication with the core node is also referred to as an S1 interface. A logical communication interface used for communication with another base station apparatus is also referred to as an X2 interface.

The radio communication circuit 101 is configured to receive a supply of a baseband signal (which may also be referred to as a radio signal or a digital radio signal) from the processing circuit 102, to generate a radio signal (which may also be referred to as a second radio signal or an analog radio signal) having a predetermined output level from the baseband signal, and to emit the radio signal to the space through the antenna. Thus, the transmission apparatus 100 may transmit a radio signal to the reception apparatus 200. The radio communication circuit 101 is configured to receive a radio signal input from the antenna, to convert the radio signal into a baseband signal, and to supply the baseband signal to the processing circuit 102. Thus, the transmission apparatus 100 may receive a radio signal from the reception apparatus 200. As described above, the radio communication circuit 101 is configured to be capable of transmitting and receiving a radio signal, and has a function of performing radio communication with the reception apparatus 200.

When the transmission apparatus 100 is a radio terminal, the radio communication circuit 101 may be coupled to the processing circuit 102 so as to be capable of communications with the processing circuit 102 through a transmission circuit in the radio terminal. The transmission circuit may be a transmission circuit conforming to a standard such as M-PHY or Dig-RF, for example.

When the transmission apparatus 100 is a base station, the radio communication circuit 101 may be coupled to the processing circuit 102 so as to be capable of communications with the processing circuit 102 through a transmission path such as a Common Public Radio Interface (CPRI), and may also be referred to as a remote radio head (RRH) or remote radio equipment (RRE). A combination of the radio communication circuit 101 and the processing circuit 102 is not limited to a one-to-one basis. A plurality of processing circuits 102 may be associated with a single radio communication circuit 101, a plurality of radio communication circuits 101 may be associated with a single processing circuit 102, and a plurality of radio communication circuits 101 may be associated with a plurality of processing circuits 102.

The processing circuit 102 is a circuit configured to perform baseband signal processing. The processing circuit 102 is configured to generate a baseband signal (which may also be referred to as a radio signal or a digital radio signal) based on a protocol stack in the radio communication system 1 and to output the baseband signal to the radio communication circuit 101. The processing circuit 102 is configured to perform reception processing such as demodulation or decoding on the baseband signal input from the radio communication circuit 101, based on the protocol stack in the radio communication system 1. For example, in the uplink, the processing circuit 102 has an aspect as a circuit that transmits a radio signal to the radio communication circuit 101 based on second data obtained by sequentially processing first data or transmission data addressed to the reception apparatus 200 from the upper layer to the lower layer, in accordance with a procedure of the protocol stack in which the functions for radio communications are divided into a plurality of layers. The processing circuit 102 has an aspect as a circuit that sequentially processes a radio signal received through the radio communication circuit 101, from the lower layer to the upper layer in accordance with the procedure of the protocol stack in which the functions for radio communications are divided into a plurality of layers. Here, receiving an input of a baseband signal from the radio communication circuit 101 has an aspect of receiving a radio signal from the reception apparatus 200 through the radio communication circuit 101.

The processing circuit 102 may be, for example, an arithmetic operation device that achieves the operation of the transmission apparatus 100 according to the above-described various examples by reading and executing a program stored in the memory 103. The processing circuit 102 may be a central processing unit (CPU), a microprocessor unit (MPU), a digital signal processor (DSP), a field-programmable gate array (FPGA), or a combination of these, for example. The processing circuit 102 may be a multicore processor including two or more cores. Regarding the processing circuit 102, two or more processing circuits 102 may be implemented according to each layer in the protocol stack of the radio communication system 1. For example, a processing circuit 102 that performs processing as a first sublayer entity (PDCP entity) belonging to the first sublayer (PDCP layer), a processing circuit 102 that performs processing as a second sublayer entity (RLC entity) belonging to the second sublayer (RLC layer), and a processing circuit 102 that performs processing as a third sublayer entity (MAC entity) belonging to the third sublayer (MAC layer) may be independently implemented.

The processing circuit 102 may also be referred to as a C-CPU. The transmission apparatus 100 may be implemented with a processor circuit also referred to as an A-CPU executing an application in addition to the processing circuit 102. The processing circuit 102 may be implemented in one chip along with a processor circuit also referred to as an A-CPU, or may be implemented in separate chips. As described above, the processing circuit 102 has an aspect as a control unit having a function of controlling the operation of the transmission apparatus 100.

The memory 103 is a circuit configured to store and hold data or a program related to baseband signal processing performed by the processing circuit 102. The memory 103 is configured to include at least both or one of a nonvolatile storage device and a volatile storage device. For example, the memory may include a random-access memory (RAM), a read-only memory (ROM), a solid state drive (SSD), and a hard disk drive (HDD). In FIG. 8, the memory 103 is the generic name of various storage devices such as main storage devices and auxiliary storage devices. Regarding the memory 103, two or more memories 103 may be implemented according to each layer in the protocol stack of the radio communication system 1 in the same manner as the processing circuit 102. For example, a memory 103 used in processing as the first sublayer entity (PDCP entity) belonging to the first sublayer (PDCP layer), a memory 103 used in processing as the second sublayer entity (RLC entity) belonging to the second sublayer (RLC layer), and a memory 103 used in processing as the third sublayer entity (MAC entity) belonging to the third sublayer (MAC layer) may be independently implemented.

The reception apparatus 200 illustrated in FIG. 8 includes a radio communication circuit 201, a processing circuit 202, and a memory 203. In the base station apparatus 20 illustrated in FIG. 17, an antenna is not illustrated. When the reception apparatus 200 is a radio terminal, the reception apparatus 200 may include, for example, a display device such as a liquid crystal display, an input device such as a touch panel, and a battery such as a lithium-ion rechargeable battery.

When the reception apparatus 200 is a base station, the reception apparatus 200 may include a wired communication circuit that converts information into packet data with a format that is suitable to be output to another device and transmits the packet data to another device, or extracts data or the like from a packet data received from another device and outputs the data to the memory 203 or the processing circuit 202. An example of another apparatus may be another base station apparatus, a Mobility Management Entity (MME), a Serving Gateway (SGW), or the like. The MME and the SGW are also referred to as a core node, and a logical communication interface used for communication with the core node is also referred to as an S1 interface. A logical communication interface used for communication with another base station apparatus is also referred to as an X2 interface.

The radio communication circuit 201 is configured to receive a supply of a baseband signal (which may also be referred to as a radio signal or a digital radio signal) from the processing circuit 202, to generate a radio signal (which may also be referred to as a second radio signal or an analog radio signal) having a predetermined output level from the baseband signal, and to emit the radio signal to the space through the antenna. Thus, the reception apparatus 200 may transmit a radio signal to the transmission apparatus 100. The radio communication circuit 201 is configured to receive a radio signal input from the antenna, to convert the radio signal into a baseband signal, and to supply the baseband signal to the processing circuit 202. Thus, the reception apparatus 200 may receive a radio signal from the transmission apparatus 100. As described above, the radio communication circuit 201 is configured to be capable of transmitting and receiving a radio signal, and has a function of performing radio communication with the transmission apparatus 100.

When the reception apparatus 200 is a base station, the radio communication circuit 201 may be coupled to the processing circuit 202 so as to be capable of communications with the processing circuit 202 through a transmission path such as a Common Public Radio Interface (CPRI), and may also be referred to as a remote radio head (RRH) or remote radio equipment (RRE). A combination of the radio communication circuit 201 and the processing circuit 202 is not limited to a one-to-one basis. A plurality of processing circuits 202 may be associated with a single radio communication circuit 201, a plurality of radio communication circuits 201 may be associated with a single processing circuit 202, and a plurality of radio communication circuits 201 may be associated with a plurality of processing circuits 202.

When the reception apparatus 200 is a radio terminal, the radio communication circuit 201 may be coupled to the processing circuit 202 so as to be capable of communications with the processing circuit 202 through a transmission circuit in the radio terminal. The transmission circuit may be a transmission circuit conforming to a standard such as M-PHY or Dig-RF, for example.

The processing circuit 202 is a circuit configured to perform baseband signal processing. The processing circuit 202 is configured to generate a baseband signal (which may also be referred to as a radio signal or a digital radio signal) based on a protocol stack in the radio communication system 1 and to output the baseband signal to the radio communication circuit 201. The processing circuit 202 is configured to perform reception processing such as demodulation or decoding on the baseband signal input from the radio communication circuit 201, based on the protocol stack in the radio communication system 1. In other words, the processing circuit 202 has an aspect as a circuit that sequentially processes data addressed to the transmission apparatus 100 from the upper layer to the lower layer, in accordance with the procedure of the protocol stack in which the functions for radio communications are divided into a plurality of layers, and transmits the data via the radio communication circuit 201. In the uplink, the processing circuit 202 has an aspect as a circuit that sequentially processes a radio signal received via the radio communication circuit 201 from the lower layer to the upper layer, in accordance with the procedure of the protocol stack in which the functions for radio communications are divided into a plurality of layers.

The processing circuit 202 may be, for example, an arithmetic operation device that achieves the operation of the reception apparatus 200 according to the above-described various examples by reading and executing a program stored in the memory 203. The processing circuit 202 may be a central processing unit (CPU), a microprocessor unit (MPU), a digital signal processor (DSP), a field-programmable gate array (FPGA), or a combination of these, for example. The processing circuit 202 may be a multicore processor including two or more cores. Regarding the processing circuit 202, two or more processing circuits 202 may be implemented according to each layer in the protocol stack of the radio communication system. For example, a processing circuit 202 that performs processing as a first sublayer entity (PDCP entity) belonging to the first sublayer (PDCP layer), a processing circuit 202 that performs processing as a second sublayer entity (RLC entity) belonging to the second sublayer (RLC layer), and a processing circuit 202 that performs processing as a third sublayer entity (MAC entity) belonging to the third sublayer (MAC layer) may be independently implemented. As described above, the processing circuit 202 has an aspect as a control unit (also referred to as a second control unit) having a function of controlling an operation of the reception apparatus 200.

The memory 203 is a circuit configured to store and hold data or a program related to baseband signal processing executed by the processing circuit 202. The memory 203 is configured to include at least both or one of a nonvolatile storage device and a volatile storage device. For example, the memory may include a random-access memory (RAM), a read-only memory (ROM), a solid state drive (SSD), and a hard disk drive (HDD). In FIG. 8, the memory 203 is the generic name of various storage devices such as main storage devices and auxiliary storage devices. Regarding the memory 203, two or more memories 203 may be implemented according to each layer in the protocol stack of the radio communication system in the same manner as the processing circuit 202. For example, a memory 203 used in processing as the first sublayer entity (PDCP entity) belonging to the first sublayer (PDCP layer), a memory 203 used in processing as the second sublayer entity (RLC entity) belonging to the second sublayer (RLC layer), and a memory 203 used in processing as the third sublayer entity (MAC entity) belonging to the third sublayer (MAC layer) may be independently implemented.

The features and the advantages of the embodiment will become apparent through the detailed description. This is intended to cover the features and advantages of the embodiment without departing from the spirit and the scope of the claims. In addition, any person skilled in the related art may further easily conceive of all improvements and changes. Therefore, there is no intention to limit the scope of the inventive embodiments to the embodiment described above, and appropriate modifications and equivalents included in the scope disclosed in the embodiments may be used. For example, the respective steps disclosed in the present specification do not have to be processed in a time series according to the order described as an example of a flow of a process, and orders of steps may be replaced with each other within the scope of the concept of the present disclosure disclosed in the claims, or a plurality of steps may be executed in parallel. The situation that may occur in the fifth generation mobile communication system, clarified through the detailed description may be found when the fifth generation mobile communication system is examined from one aspect, and it is noted that other situations may be found when the fifth generation mobile communication system is examined from other aspects. In other words, the features and the advantages of the present disclosure are not limited to an application for solving the situations described in the detailed description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission apparatus configured to transmit a radio signal to a reception apparatus in a radio communication system, the transmission apparatus comprising:
    a processing circuit configured to generate the radio signal based on second data obtained by sequentially, from an upper layer to a lower layer, processing first data addressed to the reception apparatus, each of the upper layer and the lower layer being a procedure of a protocol stack in which functions for radio communications are divided into a plurality of layers, wherein
    the processing circuit is further configured to:
    execute preprocessing configured to start generating the second data before an amount of radio resources to be allocated to the reception apparatus for transmitting the second data is determined;
    execute first processing when the amount of the radio resources to be allocated to the reception apparatus is determined, the first processing being configured to generate the radio signal based on an amount the second data which has been generated by the preprocessing and the amount of the radio resources determined to be allocated to the reception apparatus;
    execute second processing that includes performing control such that the amount of the second data generated from the first data by the preprocessing is below a first threshold; and
    adjust the first threshold based on the amount of the radio resources determined to be allocated to the reception apparatus,
    wherein the transmission apparatus further comprises:
    a radio communication circuit configured to transmit and receive the radio signal,
    wherein
    the radio communication circuit receives a first signal from the reception apparatus,
    the first threshold is adjusted by the processing circuit in accordance with the received first signal,
    the first signal includes a control signal transmitted from the reception apparatus by signaling in a first layer that is a lowermost layer in the protocol stack, and
    the processing circuit sets the first threshold based on the control signal.

2. The transmission apparatus according to claim 1, wherein
    the first signal includes a Radio Resource Control (RRC) message, and
    the first threshold is adjusted by the processing circuit in accordance with an information element contained in the RRC message.

3. The transmission apparatus according to claim 1, wherein
    the control signal includes downlink control information (DCI) of Format 0, and
    the processing circuit sets the first threshold based on the DCI of Format 0.

4. The transmission apparatus according to claim 1, wherein
    the processing circuit adjusts a second threshold based on the first threshold, the second threshold being used for determination to select a method for radio communications with two or more of the reception apparatus.

5. The transmission apparatus according to claim 1, wherein
    the processing circuit is further configured to store the generated second data in a buffer, the first processing being configured to generate the radio signal based on the amount of the second data stored in the buffer and the amount of the radio resources.

6. The transmission apparatus according to claim 1, wherein
the processing circuit is further configured to:
store the second data, which has been generated by the preprocessing, in a first buffer,
store the first data in a second buffer when an amount of the second data stored in the first buffer is equal to or greater than the first threshold,
execute the second processing that includes performing control such that the amount of the second data generated from the first data by the preprocessing and stored in the first buffer is below the first threshold, and
adjust the first threshold based on the first processing.

7. A reception apparatus configured to receive a radio signal from a transmission apparatus in a radio communication system, the reception apparatus comprising:
a radio communication circuit configured to transmit a first signal to the transmission apparatus, the first signal including a value related to adjusting a first threshold, the first threshold being a reference value for controlling an amount of a second data in the transmission apparatus executing preprocessing to generate the second data before an amount of radio resources to be allocated to the reception apparatus for transmitting the second data is determined, the transmission apparatus including a processing circuit configured to generate the radio signal based on the second data obtained by sequentially, from an upper layer to a lower layer, processing first data addressed to the reception apparatus, each of the upper layer and the lower layer being a procedure of a protocol stack in which functions for radio communications are divided into a plurality of layers, wherein
a radio communication circuit is further configured to receive, when the amount of the radio resources determined to be allocated to the reception apparatus is determined, from the transmission apparatus, the radio signal generated based on an amount of second data which has been generated by the preprocessing and the amount of the radio resources, and
the first threshold is adjusted based on the amount of the radio resources determined to be allocated to the reception apparatus,
wherein the first signal includes a control signal transmitted from the reception apparatus by signaling in a first layer that is a lowermost layer in the protocol stack, and
wherein by the transmitting of the first signal, the first threshold in the transmission apparatus is adjusted based on the control signal.

8. The reception apparatus according to claim 7, wherein
the first signal includes a Radio Resource Control (RRC) message, and
by the transmitting of the first signal, the first threshold in the transmission apparatus is adjusted based on an information element contained in the RRC message.

9. The reception apparatus according to claim 7, wherein
the control signal includes downlink control information (DCI) of Format 0, and
by the transmitting of the first signal, the first threshold in the transmission apparatus is adjusted based on the DCI of Format 0.

10. A method implemented by a transmission apparatus, the transmission apparatus including a processing circuit configured to generate a radio signal based on second data obtained by sequentially, from an upper layer to a lower layer, processing first data addressed to a reception apparatus, each of the upper layer and the lower layer being a procedure of a protocol stack in which functions for radio communications are divided into a plurality of layers, the method comprising:
executing preprocessing configured to start generating the second data before an amount of radio resources to be allocated to the reception apparatus for transmitting the second data is determined;
executing first processing when the amount of the radio resources to be allocated to the reception apparatus is determined, the first processing being configured to generate the radio signal based on an amount of the second data which has been generated by the preprocessing and the amount of the radio resources determined to be allocated to the reception apparatus;
executing second processing that includes performing control such that the amount of the second data generated from the first data is below a first threshold in the preprocessing; and
adjusting the first threshold based on the amount of the radio resources determined to be allocated to the reception apparatus,
wherein
the first threshold is adjusted based on a first signal received from the reception apparatus,
the first signal includes a control signal transmitted from the reception apparatus by signaling in a first layer that is a lowermost layer in the protocol stack, and
the first threshold is adjusted based on the control signal.

11. The method according to claim 10, wherein
the first signal includes a Radio Resource Control (RRC) message, and
the first threshold is adjusted based on an information element contained in the RRC message.

12. The method according to claim 10, wherein
the control signal includes downlink control information (DCI) of Format 0, and
the first threshold is adjusted based on the DCI of Format 0.

13. The method according to claim 10, wherein
a second threshold is adjusted based on the first threshold, the second threshold being used in determination to select a method for radio communications with two or more of the reception apparatus.

* * * * *